US012574161B2

(12) United States Patent
Lee et al.

(10) Patent No.: US 12,574,161 B2
(45) Date of Patent: Mar. 10, 2026

(54) METHOD AND APPARATUS FOR DETERMINING TIME DENSITY RELATED TO PT-RS IN NR V2X

(71) Applicant: LG ELECTRONICS INC., Seoul (KR)

(72) Inventors: Seungmin Lee, Seoul (KR); Uihyun Hong, Seoul (KR); Daesung Hwang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 580 days.

(21) Appl. No.: 17/926,406

(22) PCT Filed: May 21, 2021

(86) PCT No.: PCT/KR2021/006332
§ 371 (c)(1),
(2) Date: Nov. 18, 2022

(87) PCT Pub. No.: WO2021/235885
PCT Pub. Date: Nov. 25, 2021

(65) Prior Publication Data
US 2023/0254069 A1    Aug. 10, 2023

(30) Foreign Application Priority Data

May 21, 2020    (KR) ........................ 10-2020-0061076
May 25, 2020    (KR) ........................ 10-2020-0062325
(Continued)

(51) Int. Cl.
*H04W 72/25*    (2023.01)
*H04L 1/1812*    (2023.01)
(Continued)

(52) U.S. Cl.
CPC .......... *H04L 1/1816* (2013.01); *H04L 5/0051* (2013.01); *H04W 72/0446* (2013.01); *H04W 72/25* (2023.01); *H04W 4/40* (2018.02)

(58) Field of Classification Search
CPC ... H04L 1/1816; H04L 5/0051; H04L 1/0003; H04L 1/0009; H04L 1/0025;
(Continued)

(56) References Cited

U.S. PATENT DOCUMENTS

| | | | | |
|---|---|---|---|---|
| 2021/0320747 A1* | 10/2021 | Yoshioka | .............. | H04L 1/0009 |
| 2022/0190983 A1* | 6/2022 | Zhao | ................... | H04W 16/00 |
| 2023/0089655 A1* | 3/2023 | Yeo | ....................... | H04L 1/1896 |
| | | | | 370/329 |

OTHER PUBLICATIONS

Huawei et al., (Remaining details of sidelink physical layer structure, R1-2003493, 3GPP TSG RAN WG1 #101-e, E-meeting, May 16, 2020, pp. 1-25) (Year: 2020).*
(Continued)

*Primary Examiner* — Jae Y Lee
*Assistant Examiner* — Nhu Pham
(74) *Attorney, Agent, or Firm* — BRYAN CAVE LEIGHTON PAISNER LLP

(57) ABSTRACT

According to one embodiment, proposed is a method by which a first device performs wireless communication. The method may comprise the steps of: receiving sidelink control information (SCI) related to initial transmission of a transport block from a second device through a first physical sidelink control channel (PSCCH); receiving the transport block from the second device through a first physical sidelink shared channel (PSSCH) related to the first PSCCH; determining a resource related to a physical sidelink feedback channel (PSFCH) on the basis of an index of a slot and an index of a subchannel related to the first PSSCH; transmitting an sidelink hybrid automatic repeat request negative acknowledgment (SL HARQ NACK) related to the transport
(Continued)

block to the second device on the basis of the resource related to the PSFCH; receiving SCI related to retransmission of the transport block from the second device through a second PSCCH; and determining a time density related to a phase-tracking reference signal (PT-RS) on the basis of the fact that the SCI related to the retransmission includes a modulation coding scheme (MCS) index field indicating a reserved state. For example, the time density related to the PT-RS may be determined on the basis of a reference MCS index value related to the MCS index field indicating the reserved state.

13 Claims, 19 Drawing Sheets

(30)    Foreign Application Priority Data

| | | |
|---|---|---|
| Jun. 16, 2020 | (KR) | 10-2020-0073212 |
| Jun. 16, 2020 | (KR) | 10-2020-0073241 |
| Jun. 16, 2020 | (KR) | 10-2020-0073273 |
| Aug. 6, 2020 | (KR) | 10-2020-0098715 |

(51)  Int. Cl.

| | |
|---|---|
| *H04L 5/00* | (2006.01) |
| *H04W 4/40* | (2018.01) |
| *H04W 72/0446* | (2023.01) |

(58)  Field of Classification Search
CPC ... H04L 1/1896; H04L 1/1854; H04L 5/0048; H04L 5/0055; H04L 1/0023; H04L 1/1812; H04L 5/0094; H04W 72/0446; H04W 72/25; H04W 4/40; H04W 64/00; H04W 28/26
See application file for complete search history.

(56)         References Cited

OTHER PUBLICATIONS

Huawei et al., Remaining details of sidelink physical layer structure, R1-2003493, 3GPP TSG RAN WG1 #101-e, E- meeting, May 16, 2020, see pp. 1-25.
Samsung, PUSCH enhancement for eURLC, R1-1912474, 3GPP TSG RAN WG1 #99, Reno, USA, Nov. 8, 2019, see pp. 1-10.
LG Electronics, Discussion on physical layer structure for NR sidelink, R1-2000781, 3GPP TSG RAN WG1 #100, E-meeting, Feb. 15, 2020, see pp. 1-32.
NTT Docomo, Inc., Remaining issues on resource allocation mechanism mode 1, R1-2004384, 3GPP TSG RAN WG1 #101, E-meeting, May 15, 2020, see pp. 1-11.
Qualcomm Incorporated, Consideration on Physical Layer aspects of NR V2X, R1-1912944, 3GPP TSG RAN WG1 #98b, Reno, USA, Nov. 9, 2019, see pp. 1-13.
Section 7.4.1.1.2 of 3GPP TS 38.211 V16.1.0.

* cited by examiner

FIG. 3

BS(e.g. eNB or gNB)

Figure 17:
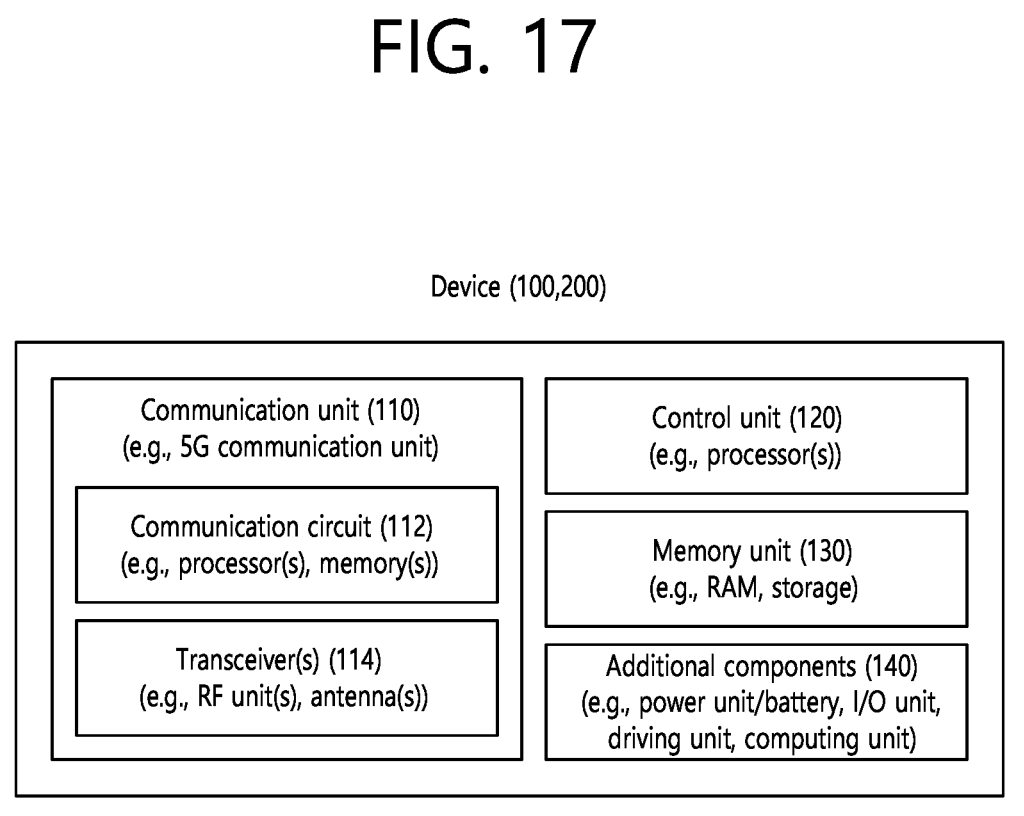

Device (100,200)

| Communication unit (110)<br>(e.g., 5G communication unit) | Control unit (120)<br>(e.g., processor(s)) |
|---|---|
| Communication circuit (112)<br>(e.g., processor(s), memory(s)) | Memory unit (130)<br>(e.g., RAM, storage) |
| Transceiver(s) (114)<br>(e.g., RF unit(s), antenna(s)) | Additional components (140)<br>(e.g., power unit/battery, I/O unit,<br>driving unit, computing unit) |

FIG. 19

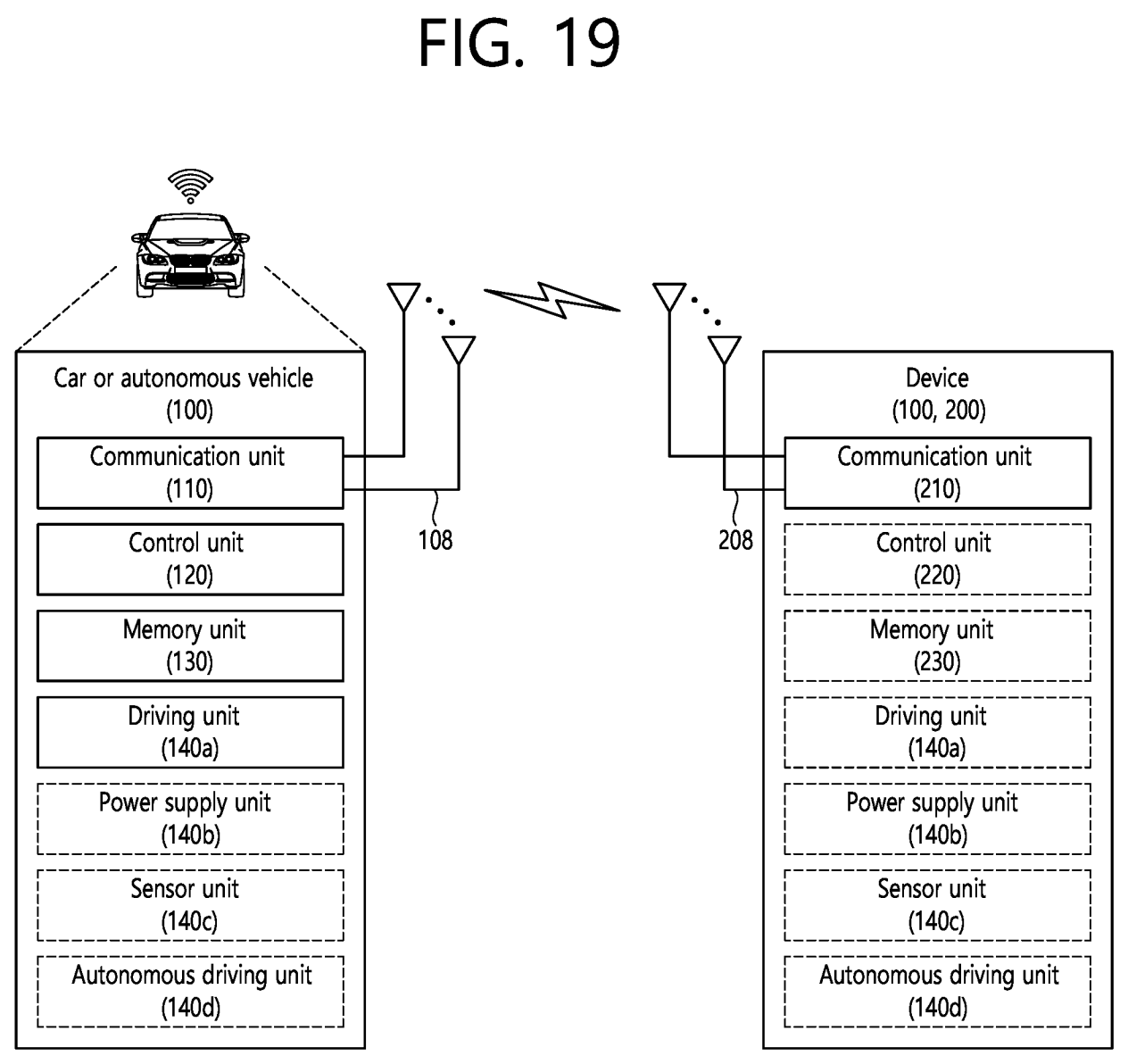

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

METHOD AND APPARATUS FOR DETERMINING TIME DENSITY RELATED TO PT-RS IN NR V2X

This application is the National Stage filing under 35 U.S.C. 371 of International Application No. PCT/KR2021/006332 filed on May 21, 2021, which claims priority to Korean Patent Application Nos. 10-2020-0061076 filed on May 21, 2020; 10-2020-0062325 filed on May 25, 2020; 10-2020-0073212 filed on Jun. 16, 2020; 10-2020-0073241 filed on Jun. 16, 2020, 10-2020-0073273 filed on Jun. 16, 2020 and 10-2020-0098715 filed on Aug. 6, 2020, the contents of which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, in sidelink communication, when a transmitting UE receives hybrid automatic repeat request (HARQ) feedback information (e.g., NACK) from a receiving UE through a physical sidelink feedback channel (PSFCH), since it can be assumed that the receiving UE succeeded in decoding a physical sidelink control channel (PSCCH) transmitted from the transmitting UE (e.g., 1st sidelink control information (SCI) or 2nd SCI), it may not be a problem even if a modulation and coding scheme (MCS) field on SCI related to retransmission of a transport block (TB) is designated as "reserved state (hereinafter, RESERVED STATE)".

At this time, when setting the time domain of a phase tracking reference signal (PT-RS) on a resource related to the retransmission, if the MCS field related to the PT-RS is designated as "RESERVED STATE", A problem may arise as to which MCS index value the UE should determine the time density of the PT-RS based on.

According to an embodiment of the present disclosure, a method for performing, by a first device, wireless communication is proposed. The method comprises: receiving, from a second device, sidelink control information (SCI) related to an initial transmission of a transport block through a first physical sidelink control channel (PSCCH); receiving, from the second device, the transport block through a first physical sidelink shared channel (PSSCH) related to the first PSCCH; determining a resource related to a physical sidelink feedback channel (PSFCH), based on an index of a subchannel and an index of a slot related to the first PSSCH; transmitting, to the second device, sidelink hybrid automatic repeat request negative acknowledgement (SL HARQ NACK) related to the transport block, based on the resource related to the PSFCH; receiving, from the second device, SCI related to a retransmission of the transport block through a second PSCCH; and determining a time density related to a phase-tracking reference signal (PT-RS), based on the SCI related to the retransmission including a modulation coding scheme (MCS) index field which represents a reserved state. For example, the time density related to the PT-RS may be determined based on a reference MCS index value related to the MCS index field which represents the reserved state.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive, from a second device, sidelink control information (SCI) related to an initial transmission of a transport block through a first physical sidelink control channel (PSCCH); receive, from the second device, the transport block through a first physical sidelink shared channel (PSSCH) related to the first PSCCH; determine a resource related to a physical sidelink feedback channel (PSFCH), based on an index of a subchannel and an index of a slot related to the first PSSCH; transmit, to the second device, sidelink hybrid automatic repeat request negative acknowledgement (SL HARQ NACK) related to the transport block, based on the resource related to the PSFCH; receive, from the second device, SCI related to a retransmission of the transport block through a second PSCCH; and determine a time density related to a phase-tracking reference signal (PT-RS), based on the SCI related to the retransmission including a modulation coding scheme (MCS) index field which represents a reserved state, wherein the time density related to the PT-RS may be determined based on a reference MCS index value related to the MCS index field which represents the reserved state.

The user equipment (UE) can efficiently perform SL communication.

BRIEF DESCRIPTION OF THE DRAWINGS

FIG. 3 shows a radio protocol architecture, based on an embodiment of the present disclosure.

FIG. 17 shows another example of a wireless device, based on an embodiment of the present disclosure.

FIG. 19 shows a vehicle or an autonomous vehicle, based on an embodiment of the present disclosure.

DESCRIPTION OF EXEMPLARY EMBODIMENTS

Figure 1:
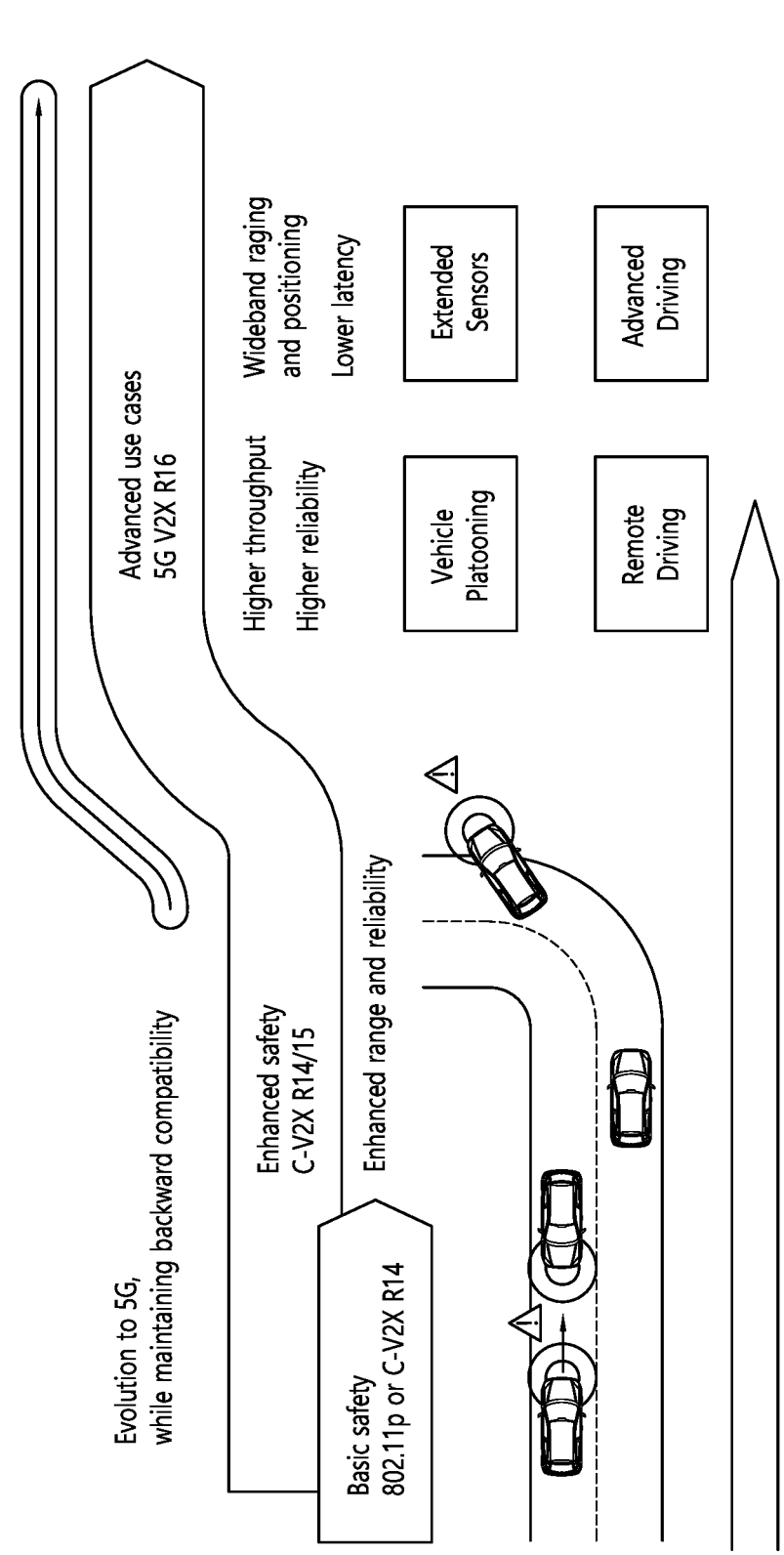
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
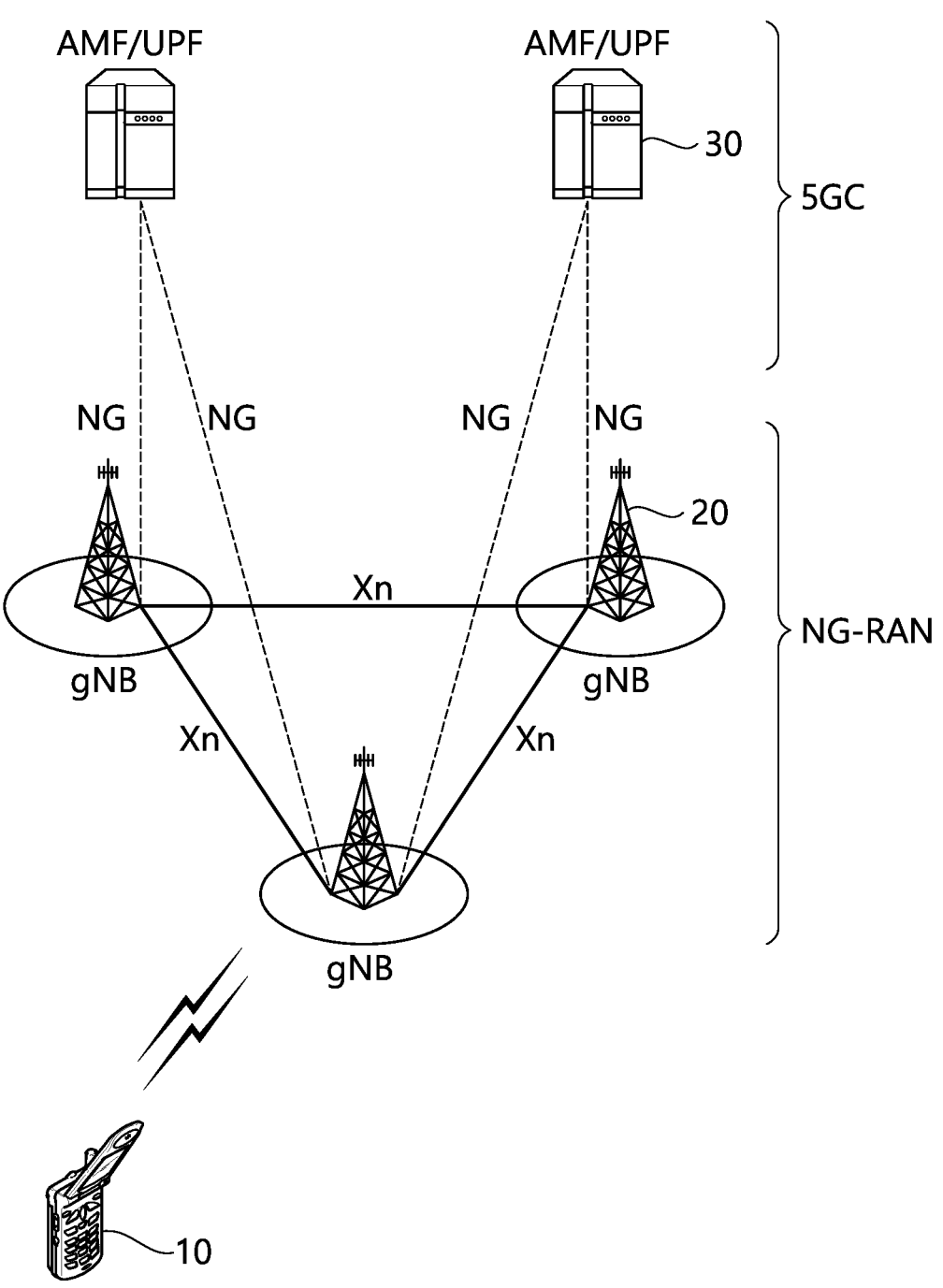
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
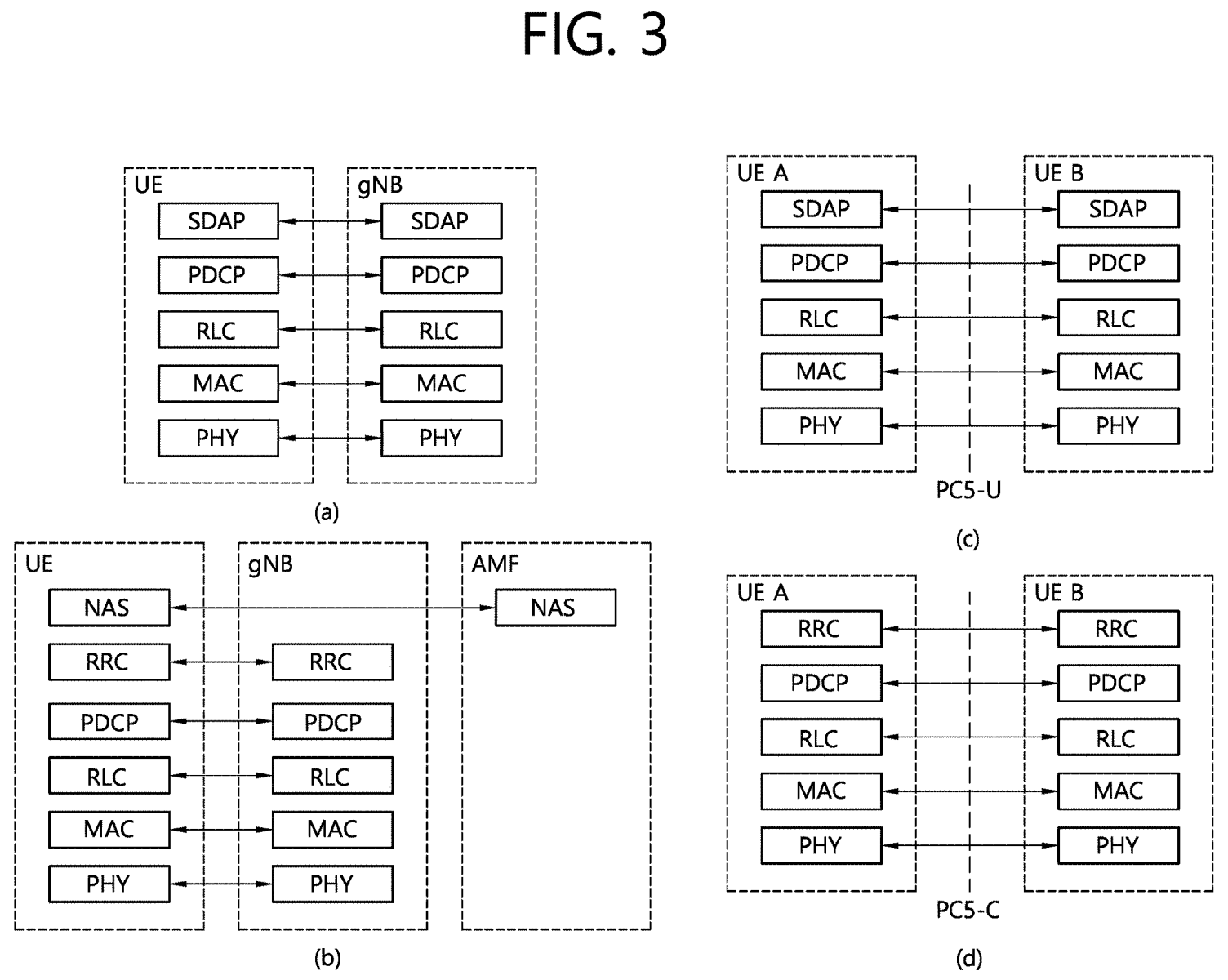

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
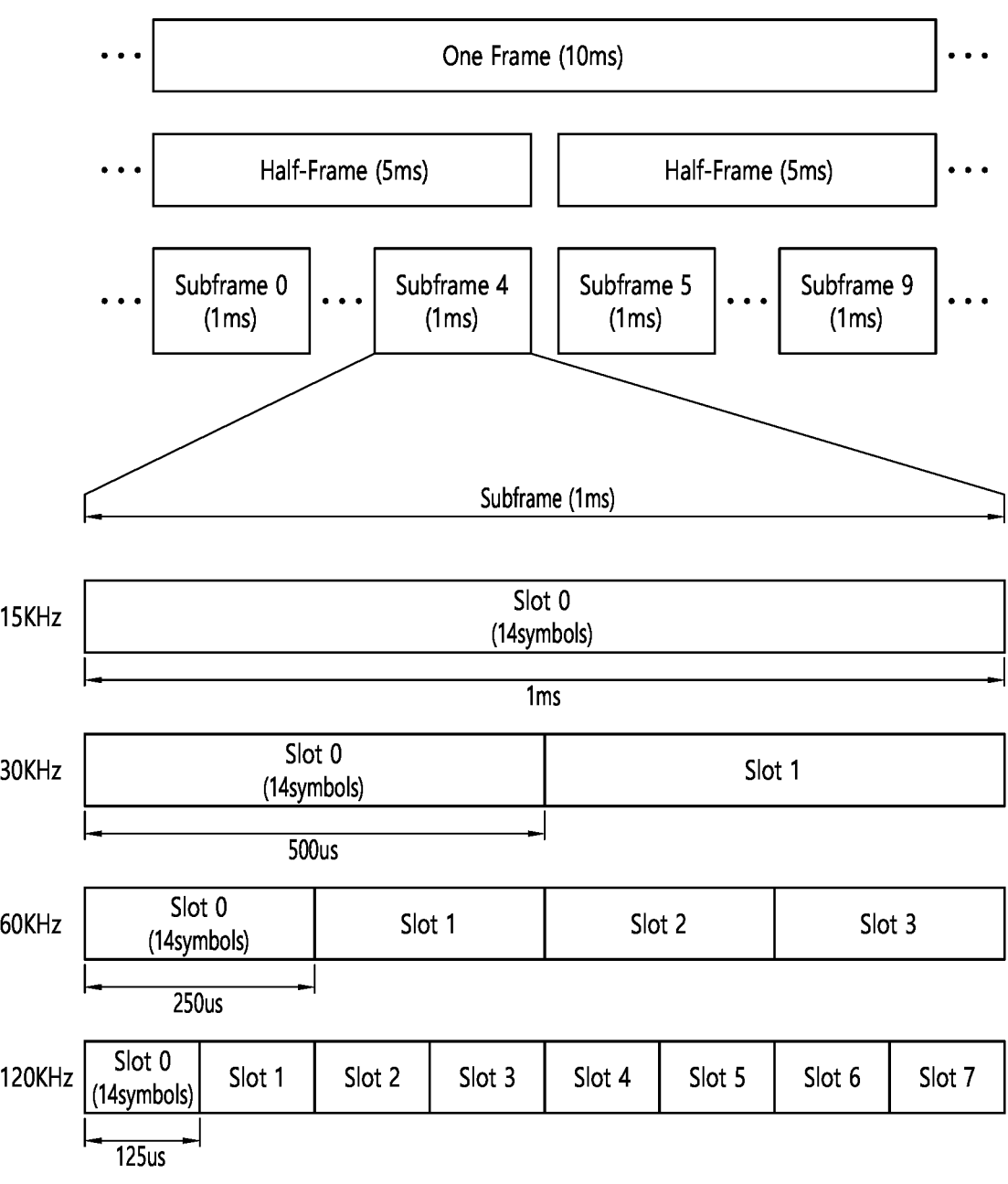
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
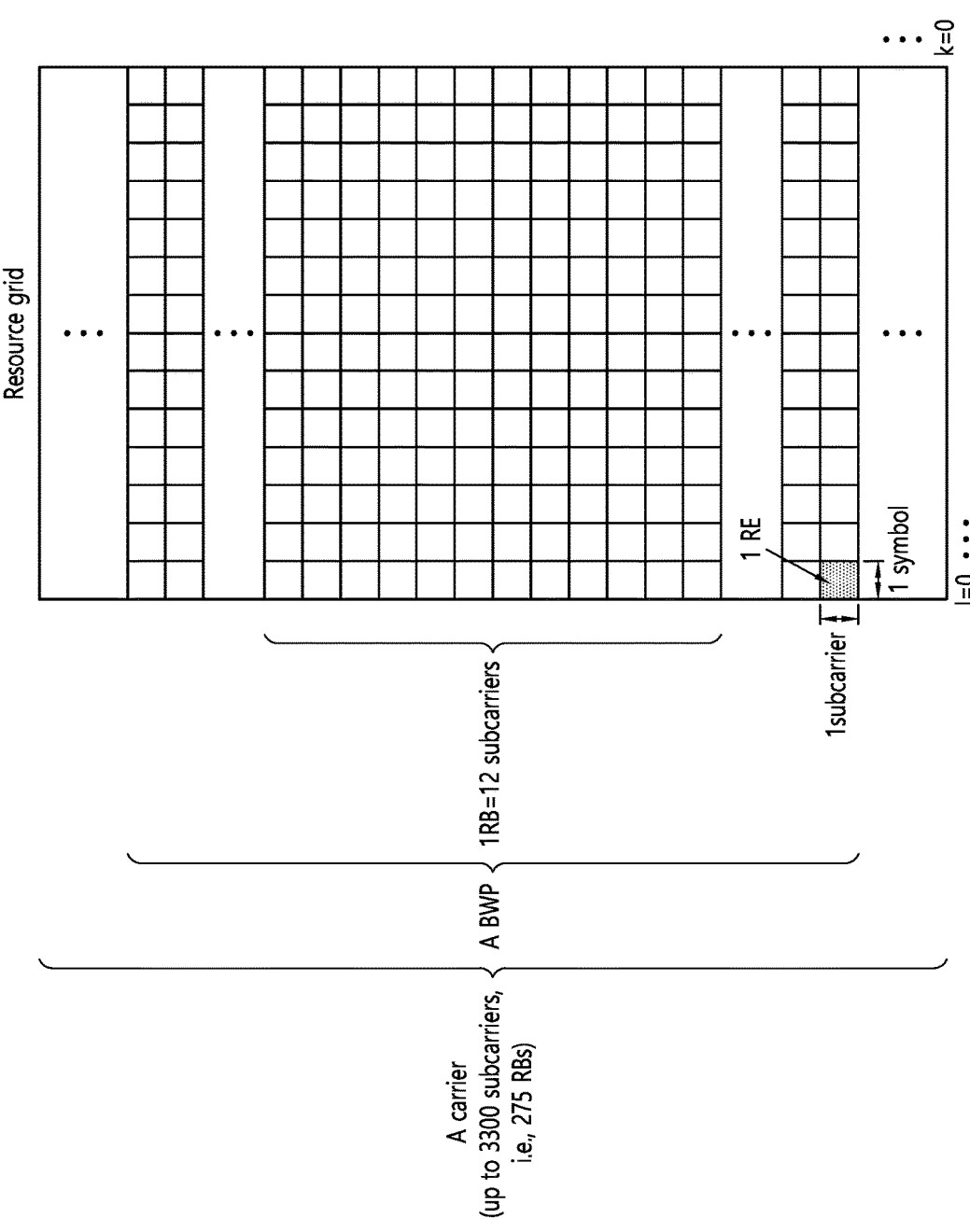
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
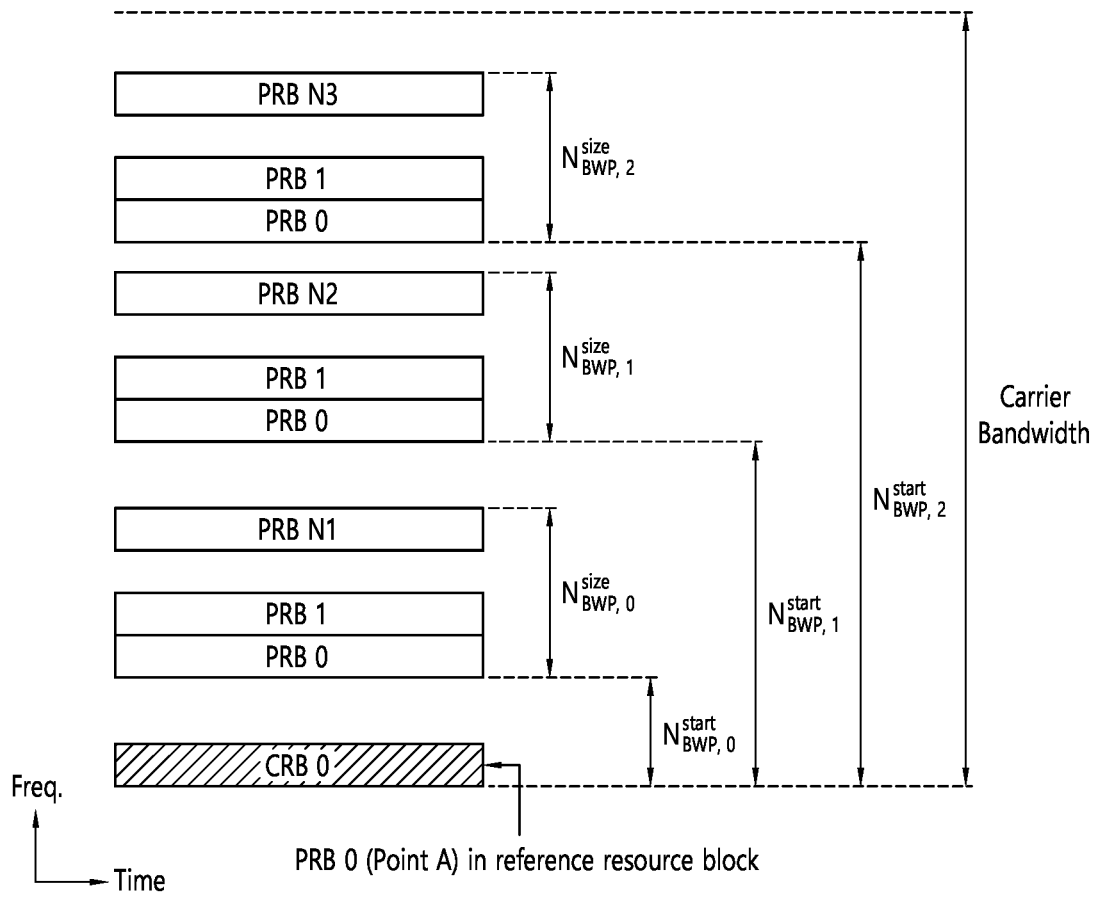
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
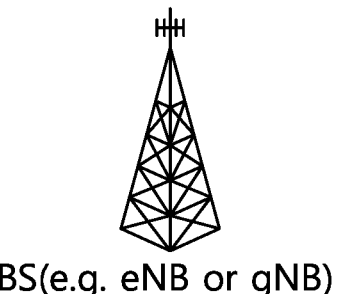
FIG. 7 shows a UE performing V2X or SL communication, based on an embodiment of the present disclosure.
Figure 7:
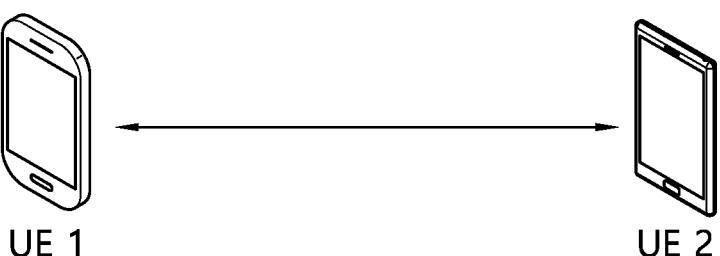

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
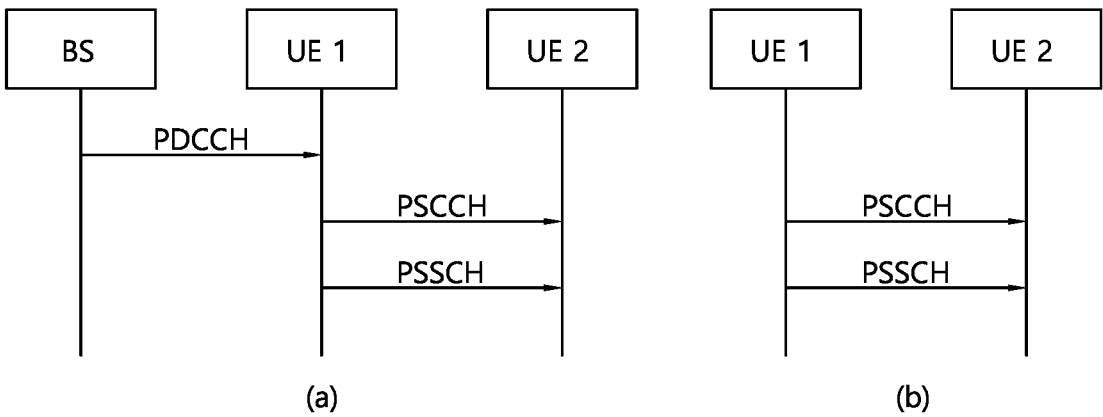
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re) selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
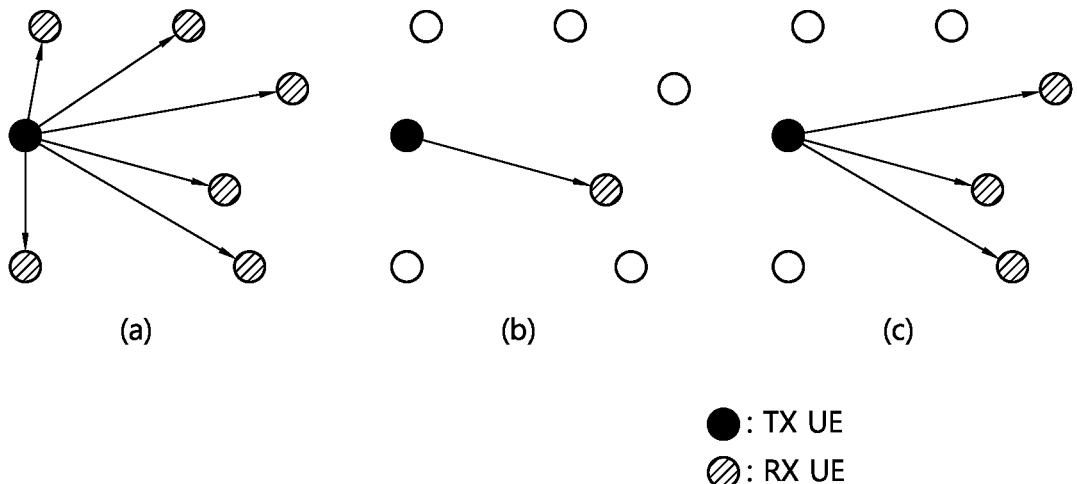
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. And/or, for example, the TX UE may be a UE which transmits SL CSI-RS(s) and/or a SL CSI report request indication to (target) RX UE(s). And/or, for example, the TX UE may be a UE which transmits a (control) channel (e.g., PSCCH, PSSCH, etc.) and/or reference signal(s) (e.g., DM-RS(s), CSI-RS(s), etc.) through the (control) channel, which is/are used for SL radio link monitoring (RLM) and/or SL radio link failure (RLF) operation(s) of (target) RX UE(s).

Meanwhile, in various embodiments of the present disclosure, for example, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. And/or, for example, the RX UE may be a UE which performs SL CSI transmission to TX UE(s) based on SL CSI-RS(s) and/or a SL CSI report request indication received from TX UE(s). And/or, for example, the RX UE may be a UE which transmits, to TX UE(s), an SL (L1) RSRP measurement value measured based on (pre-defined) reference signal(s) and/or SL (L1) RSRP report request indication received from TX UE(s). And/or, for example, the RX UE may be a UE which transmits its own data to TX UE(s). And/or, for example, the RX UE may be a UE which performs SL RLM operation(s) and/or SL RLF operation(s) based on a (pre-configured) (control) channel and/or reference signal(s) through the (control) channel received from TX UE(s).

Meanwhile, in various embodiments of the present disclosure, for example, when a receiving UE transmits SL HARQ feedback information for a PSSCH and/or a PSCCH received from a transmitting UE, the following method may be considered or partly considered. Here, for example, the corresponding scheme or some schemes may be limitedly applied only when a receiving UE successfully decodes/detects a PSCCH for scheduling a PSSCH.

(1) Groupcast option 1: negative acknowledgment (NACK) information may be transmitted to a TX UE only when an RX UE fails to decode/receive a PSSCH received from the TX UE.

(2) Groupcast option 2: If an RX UE successfully decodes/receives a PSSCH received from a TX UE, it may transmit ACK information to the TX UE, and if it fails to decode/receive the PSSCH, it may transmit NACK information to the TX UE.

Meanwhile, in various embodiments of the present disclosure, for example, a TX UE may transmit the following information or some of the following information to an RX UE through SCI. Here, for example, a TX UE may transmit some or all of the following information to an RX UE through first SCI (FIRST SCI) and/or second SCI (SECOND SCI).

PSSCH (and/or PSCCH) related resource allocation information (e.g., the location/number of a time/frequency resource, resource reservation information (e.g., periodicity)

SL CSI report request indicator or SL (L1) reference signal received power (RSRP) (and/or SL (L1) RSRQ (reference signal received quality) and/or SL (L1) RSSI (reference signal strength indicator)) report request indicator SL CSI transmission indicator (on PSSCH) (or SL (L1) RSRP (and/or SL (L1) RSRQ and/or SL (L1) RSSI) information transmission indicator)

MCS (Modulation and Coding Scheme) information

TX POWER information

L1 DESTINATION ID information and/or L1 SOURCE ID information

SL HARQ PROCESS ID information

NDI (new data indicator) information

RV (redundancy version) information (transmission TRAFFIC/PACKET related) QoS information (e.g., PRIORITY information)

SL CSI-RS transmission indicator or the number of antenna ports information of SL CSI-RS (being transmitted)

Location information or TX UE or location (or distance range) information of target RX UE (where SL HARQ feedback is requested)

Reference signal (e.g., DM-RS, etc.) information related to decoding (and/or channel estimation) of data being transmitted through a PSSCH. For example, it may be information related to a pattern of (time-frequency) mapping resource of a DM-RS, RANK information, antenna port index information, antenna port number information, etc.

Meanwhile, for example, since a TX UE can transmit SCI, first SCI (FIRST SCI) and/or second SCI (SECOND SCI) to RX UE through PSCCH, PSCCH may be replaced/substituted with at least one of SCI, first SCI and/or second SCI. And/or, for example, SCI may be replaced/substituted with PSCCH, first SCI and/or second SCI. And/or, for example, since a TX UE may transmit second SCI to an RX UE through a PSSCH, a PSSCH may be replaced/substituted with second SCI.

Meanwhile, in various embodiments of the present disclosure, for example, when SCI configuration fields are divided into two groups in consideration of the (relatively) high SCI payload size, first SCI including the first SCI configuration field group may be referred to as a $1^{st}$ SCI, and second SCI including the second SCI configuration field group may be referred to as a $2^{nd}$ SCI. Also, for example, $1^{st}$ SCI may be transmitted to a receiving UE through a PSCCH. Also, for example, $2^{nd}$ SCI may be transmitted to a receiving UE through an (independent) PSCCH or may be piggybacked and transmitted together with data through a PSSCH.

Meanwhile, in various embodiments of the present disclosure, for example, "configuration" or "definition" may mean (resource pool specific) (PRE) CONFIGURATION from a base station or network (via predefined signaling (e.g. SIB, MAC, RRC, etc.)).

Meanwhile, in various embodiments of the present disclosure, for example, since RLF may be determined based on an OUT-OF-SYNCH (OOS) indicator or an IN-SYNCH (IS) indicator, RLF can be replaced/substituted with OUT-OF-SYNCH (OOS) or IN-SYNCH (IS).

Meanwhile, in various embodiments of the present disclosure, for example, RB may be replaced/substituted with SUBCARRIER. Also, as an example, in the present disclosure, a PACKET or TRAFFIC may be replaced/substituted with a TB or MAC PDU according to a transmitted layer.

Meanwhile, in various embodiments of the present disclosure, CBG may be replaced/substituted with TB.

Meanwhile, in various embodiments of the present disclosure, for example, SOURCE ID may be replaced/substituted with DESTINATION ID.

Meanwhile, in various embodiments of the present disclosure, for example, an L1 ID may be replaced/substituted with an L2 ID. For example, an L1 ID may be an L1 SOURCE ID or an L1 DESTINATION ID. For example, an L2 ID may be an L2 SOURCE ID or an L2 DESTINATION ID.

Meanwhile, in various embodiments of the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in various embodiments of the present disclosure, a SUB-SELECTION WINDOW may be replaced/substituted with a SELECTION WINDOW and/or a pre-configured number of resource configures within the SELECTION WINDOW, or vice versa.

Meanwhile, in various embodiments of the present disclosure, SL MODE 1 may refer to a resource allocation method or a communication method in which a base station directly schedules SL transmission resource(s) for a TX UE through pre-defined signaling (e.g., DCI). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in configured grant type 1, a grant may be provided by RRC signaling and stored as a configured grant. For example, in the configured grant type 2, a grant may be provided by a PDCCH, and may be stored or deleted as a configured grant based on L1 signaling indicating activation or deactivation of the grant.

Meanwhile, in various embodiments of the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in various embodiments of the present disclosure, a resource may be replaced/substituted with a slot or a symbol, or vice versa. For example, the resource may include a slot and/or a symbol.

Meanwhile, in various embodiments of the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in various embodiments of the present disclosure, a reserved resource and/or a selected resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering reporting on sidelink channel state information/sidelink channel quality information (hereinafter referred to as SL_CSI information) may be mutually replaced/substituted by sidelink channel state information reference signal (CSI-RS) reception.

Meanwhile, in various embodiments of the present disclosure, a blind retransmission may mean that a TX UE performs a retransmission without receiving SL HARQ feedback information from an RX UE. For example, a retransmission based on SL HARQ feedback may mean that a TX UE determines whether to perform a retransmission based on SL HARQ feedback information received from an RX UE. For example, when a TX UE receives NACK and/or DTX information from an RX UE, the TX UE may perform retransmission to the RX UE.

Meanwhile, in various embodiments of the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in various embodiments of the present disclosure, a Uu channel may include a UL channel and/or a DL channel. For example, a UL channel may include PUSCH, PUCCH, SRS, and the like. For example, a DL channel may include PDCCH, PDSCH, PSS/SSS, and the like. For example, an SL channel may include PSCCH, PSSCH, PSFCH, PSBCH, PSSS/SSSS, and the like.

Meanwhile, in various embodiments of the present disclosure, sidelink information may include at least one of a sidelink message, a sidelink packet, a sidelink service, sidelink data, sidelink control information, and/or a sidelink transport block (TB). For example, sidelink information may be transmitted through PSSCH and/or PSCCH.

On the other hand, in NR V2X communication or NR sidelink communication, a transmitting UE may reserve/select one or more transmission resources for sidelink transmission (e.g., initial transmission and/or retransmission), the transmitting UE may notify a receiving UE of information about the location of the one or more transmission resources.

Meanwhile, in communication between UEs, there may be conditions for efficient SL SSB transmission in relation to transmission of the SL SSB. Hereinafter, according to an embodiment of the present disclosure, a method for alleviating constraints on Uu scheduling to guarantee SL SSB transmission/reception operations while efficiently configuring 160 ms periodic SL SSB resources is described.

For example, a resource related to SL SSB transmission/reception (hereinafter, SL_SSBRSC) may be configured on a resource (hereinafter, CANDI_RSC) that satisfies various conditions of the present disclosure. Or, for example, only SL_SSBRSC configured on resources that satisfy various conditions of the present disclosure may be considered valid. Here, for example, in the case of SL_SSBRSC configured on resources that do not satisfy various conditions of the present disclosure, the UE may not perform SL SSB transmission/reception operations based on them. Also, for example, "SL_SSBRSC" may be the number of symbols required for SL SSB transmission based on SL numerology (e.g., sub-carrier spacing, CP type/length) (for example, 13 for normal CP or 14 for TX-RX switching symbols, 11 for extended CP or 12 for TX-RX switching symbols). Or, for example, "SL_SSBRSC" may be an SL SSB duration. Also, for example, in the present disclosure, the use of resources related to CANDI_RSC may be configured by at least one of a base station/network and a predefined indicator (e.g., TDD configuration) on a PSBCH received from a synchronization source. In addition, in the present disclosure, "a flexible resource" may be a remaining resource that is not designated as a UL resource through a predefined indicator (e.g., TDD configuration) on a PSBCH. Or, for example, "a flexible resource" may be a candidate resource that can be configured as an SL resource. Also, for example, in the present disclosure, CANDI_RSC may be a resource that overlaps SL_SSBRSC based on SL numerology in the time domain (e.g., CANDI_RSC may be a super set of SL_SSBRSC in the time domain). In addition, in the present disclosure, "a UL resource" may be a UL resource configured through UE (group)-SPECIFIC signaling. For example, "a UL resource" may be a UL resource configured through RRC or DCI signaling. For example, "a UL resource" may be a candidate resource for which an SL resource can be configured. At this time, for example, a UE may not expect the corresponding UL resource to be used/changed for DL/flexible purposes by a base station/network.

In addition, for example, other than a UL slot signaled through a predefined field on a PSBCH, the remaining resources (e.g., slots) may be regarded as resources for which SL resources cannot be configured. For example, in addition to a UL slot signaled through a predefined field on a PSBCH, the remaining resources (e.g., slots) may be regarded as flexible resources/DL resources.

For example, CANDI_RSC may be resources in which the all resources overlapping with SL_SSBRSC in the time domain are at least configured as cell-specific UL resources (e.g., symbols). Here, for example, when the above rule is applied, CANDI_RSC in which some or all of resources overlapping SL_SSBRSC in the time domain are configured for cell-specific DL/flexible use may not be configured to SL_SSBRSC. Alternatively, SL_SSBRSC configured on the corresponding CANDI_RSC may be invalid. For example, when SL communication is performed on an ITS dedicated carrier, CANDI_RSC may be resources in which the all resources overlapping with SL_SSBRSC in the time domain are at least configured as cell-specific UL resources (e.g., symbols). For example, when SL communication is performed on an ITS dedicated carrier, CANDI_RSC may be resources in which the all resources overlapping with SL_SSBRSC in the time domain are at least configured as cell-specific UL resources (e.g., symbols).

For example, CANDI_RSC may be resources in which the resources overlapping with SL_SSBRSC in the time domain are at least configured as cell-specific UL resources/flexible resources. Here, for example, when the above rule is applied, CANDI_RSC, in which some or all resources overlapping with SL_SSBRSC in the time domain, are configured for cell-specific DL use, may not be configured as SL_SSBRSC. Alternatively, SL_SSBRSC configured on the corresponding CANDI_RSC may be invalid. For example, a UE may not expect that the corresponding cell-specific flexible resource set to SL_SSBRSC is used/changed for DL purposes by a base station/network. For example, resource conditions in which resource pool bit-maps related to transmission/reception of other SL channels/signals (e.g., PSCCH/PSSCH, PSFCH) can be configured/applied, and resource conditions in which resources related to SL SSB transmission/reception can be configured may be different. For example, when SL communication is performed on a licensed carrier, CANDI_RSC may be resources in which the resources overlapping with SL_SSBRSC in the time domain are at least configured as cell-specific UL resources/flexible resources.

For example, CANDI_RSC may be resources in which the resources overlapping with SL_SSBRSC in the time domain is at least configured as cell-specific UL resources/flexible resources/DL resources. Here, for example, when the above rule is applied, a UE may not expect that the corresponding cell-specific flexible resource configured to SL_SSBRSC is used/changed for DL purposes by a base station/network. Or, for example, it can be expected that DL scheduling (e.g., PDCCH, PDSCH) is not performed on a corresponding cell-specific DL resource configured to SL_SSBRSC. For example, when SL communication is performed on a licensed carrier, CANDI_RSC may be resources in which the resources overlapping with SL_SSBRSC in the time domain is at least configured as cell-specific UL resources/flexible resources/DL resources.

Meanwhile, in sidelink communication, in the case of a PSSCH in which signals are transmitted in multi-layers, a modulated symbol after scrambling may be mapped by being copied for each layer. In this case, for example, different from an SL-SCH transmitted on a PSSCH, different values for each layer may be mapped to 2nd SCI transmitted on the PSSCH after scrambling. Hereinafter, a mapping method of a 2nd SCI scrambling sequence according to an embodiment of the present disclosure will be described.

For example, when polar coding for 2nd SCI is supported, the number of coded bits may be quantized. That is, for example, a UE may use only the polar coding size used in a PDCCH. For example, in the case of PDCCH, n may have values of 7, 8, and 9 according to Table 5 below. At this time, for example, DCI size (K) may be assumed to be 64 bits. That is, N may have values of 128, 256, and 512. For example, when generating a 2nd SCI scrambling sequence, a UE uses an N value. Alternatively, for example, when a UE generates a 2nd SCI scrambling sequence to transmit in X layers, the UE may map the same (Y/X) for each layer after generating a sequence of one length (Y). Alternatively, for example, a UE may generate and map a 2nd SCI scrambling sequence having the same length for each layer.

TABLE 5

5.3.1 Polar coding
The bit sequence input for a given code block to channel coding is denoted by $c_0,c_1,c_2,c_3,\ldots,c_{K-1}$, where K is the number of bits to encode. After encoding the bits are denoted by $d_0,d_1,\ldots,d_{N-1}$, where $N = 2^n$ and the value of n is determined by the following:
  Denote by E the rate matching output sequence length as given in Clause 5.4.1;
  If $E \leq (9/8) \cdot 2^{(\lceil log_2 E \rceil -1)}$ and $K/E < 9/16$
    $n_1 = \lceil log_2 E \rceil -1$);
  else
    $n_1 = \lceil log_2 E \rceil$;
  end if
  $R_{min} = 1/8$;
  $n_2 = \lceil log_2(K/R_{min}) \rceil$;
  $n = \max\{\min\{n_1,n_2,n_{max}\},n_{min}\}$
  where $n_{min} = 5$.

For example, when the maximum data rate of a PSSCH is configured and the data rate of the current PSSCH is not satisfied, a UE may operate as follows for the maximum data rate.

For example, a UE may assume that a specific DMRS pattern is used. Alternatively, for example, a UE may assume that a specific DMRS pattern is not used. For example, in order to increase the number of REs allocated to a PSSCH, the use of a DMRS pattern of 4 symbols per slot may be disabled. Alternatively, for example, in order to increase the number of REs allocated to a PSSCH, only a DMRS pattern of 2 symbols per slot may be used.

For example, it may be assumed that a UE configures a specific PSFCH transmission period. Alternatively, for example, it may be assumed that a UE cannot configure a specific PSFCH transmission period. For example, by setting the PSFCH transmission period to 4, the number of REs allocated to a PSFCH can be configured to be small, that is, the number of REs allocated to a PSSCH can be configured to be large.

For example, information related to a configuration of a PSSCH maximum data rate may be specifically configured based on at least one of service type, priority, service QoS parameters (e.g., reliability, latency), UE speed, UE type, subchannel size or scheduled frequency resource region size, differently or independently by a network/base station. Or, for example, information related to a configuration of a PSSCH maximum data rate may be implicitly determined based on a pre-configured parameter (e.g., frequency resource size, etc.). Here, for example, the speed of a UE may include the absolute speed of a UE or the relative speed of a UE. Also, for example, whether or not the above-described rule is applied may be specifically configured based on at least one of service type, priority, service QoS parameters (e.g., reliability, latency), UE speed, UE type, subchannel size or scheduled frequency resource region size, differently or independently by a network/base station. Alternatively, for example, whether to apply the aforementioned rule may be implicitly determined based on a pre-configured parameter (e.g., frequency resource size).

Meanwhile, in sidelink communication, when a TX UE receives HARQ feedback information (e.g., NACK) from an RX UE through a PSFCH, since it can be assumed that the RX UE successfully decodes a PSCCH (e.g., 1st-stage SCI or 2nd-stage SCI) transmitted from the TX UE, it may not be a problem even if an MCS field on SCI related to TB retransmission is designated as "reserved state (hereinafter referred to as RESERVED STATE)".

As such, if the MCS field in the SCI related to the TB retransmission is designated as "RESERVED STATE", the UE can configure the coding rate of the corresponding 2nd SCI based on the MCS field of the initial transmission. Here, for example, 2nd SCI may be an SCI related to a retransmission. However, for example, if a UE fails to decode an initial transmission and an MCS field on SCI related to a retransmission is designated as "RESERVED STATE", a problem may occur when configuring the coding rate of the corresponding 2nd SCI. That is, in this case, for example, a UE may not have an MCS field for configuring the coding rate of 2nd SCI. Also, for example, when an RX UE receives TB transmission resources three times (at this time, SCI related to each TB is referred to as SCI 1, SCI 2, and SCI 3), the RX UE may receive two SCIs and may not be able to receive any one SCI. For example, when an RX UE receives SCI 1 or SCI 2 after receiving SCI 3, if the MCS values of SCI 1 and SCI 2 are different, if the MCS values of SCI 1 and SCI 2 are different, ambiguity about the previous MCS value may occur to the RX UE. That is, for example, since the MSC values of SCI 1 and SCI 2 are different for an RX UE, it may be difficult to distinguish between SCI 1 and SCI 2, and ambiguity regarding coding rates may occur.

Hereinafter, according to an embodiment of the present disclosure, a method of setting the coding rate of corresponding 2nd SCI when an MCS field on SCI related to a retransmission is designated as "RESERVED STATE" will be described. For example, 2nd SCI may be an SCI related to a retransmission. In the present disclosure, for example, configuration, definition or designation may be that a base station/network configures or pre-configures related information to a UE through predefined signaling (e.g., SIB, RRC, MAC CE). Or, in the present disclosure, for example, configuration, definition or designation may be that a UE informs a different UE of related information through pre-defined signaling (e.g., PC5 RRC, MAC CE, PSCCH/PSCCH).

For example, if an MCS field on SCI related to TB retransmission is indicated as "RESERVED STATE", a UE may determine the coding rate of 2nd SCI based on at least one rule of the present disclosure.

For example, according to the first rule, when an MCS field on SCI related to TB retransmission is indicated as "RESERVED STATE", a UE can determine the coding rate of 2nd SCI based on a configured value. For example, when an MCS field on SCI related to a TB retransmission is indicated as "RESERVED STATE", a UE can determine the coding rate of 2nd SCI based on a pre-configured value from a base station/network.

For example, according to the second rule, when an MCS field on SCI related to a TB retransmission is indicated as "RESERVED STATE", since an MCS table is indicated in the SCI related to retransmission of the TB, a UE may determine the coding rate of 2nd SCI based on the coding rate related to the MCS index in the indicated MCS table. For example, an MCS index in the MCS table may exclude an MCS index corresponding to the RESERVED STATE. For example, the coding rate of 2nd SCI may be determined based on the lowest coding rate among coding rates related to an MCS index in the MCS table. For example, the coding rate of 2nd SCI may be determined based on the highest coding rate among coding rates related to an MCS index in the MCS table. Or, for example, the coding rate of 2nd SCI may be determined based on an average value of coding rates related to an MCS index in the MCS table. Or, for example, the coding rate of 2nd SCI may be determined based on an intermediate value of the coding rate among coding rates related to an MCS index in the MCS table. For example, when an MCS field on SCI related to a TB retransmission is indicated as "RESERVED STATE", a UE may determine the coding rate of 2nd SCI based on a value having the lowest coding rate related to the MCS index among MCS indexes excluding the RESERVED STATE in the indicated MCS table.

For example, according to the third rule, when an MCS field on SCI related to a TB retransmission is indicated as "RESERVED STATE", since the SCI related to the TB retransmission indicates an MCS table, a UE may determine the coding rate of 2nd SCI based on coding rate related to an MCS index with the same modulation order as the modulation order indicated by an MCS index for "RESERVED STATE" in the indicated MCS table. For example, the coding rate of 2nd SCI may be determined based on the lowest coding rate among coding rates related to MCS indexes with the same modulation order. Or, for example, the coding rate of 2nd SCI may be determined based on the highest coding rate among coding rates related to MCS indexes with the same modulation order. Or, for example, the coding rate of 2nd SCI may be determined based on an average value of coding rates related to the MCS indexes with the same modulation order. Or, for example, the coding rate of 2nd SCI may be an intermediate value of coding rates related to the MCS indexes with the same modulation order. For example, when an MCS field on SCI related to a TB retransmission is indicated as "RESERVED STATE", a UE may determine the coding rate of 2nd SCI based on the lowest coding rate among coding rates related to MCS indexes with the same modulation order as the modulation order indicated by the MCS index for the RESERVED STATE in the indicated MCS table.

For example, according to the fourth rule, when an MCS field on SCI related to a TB retransmission is indicated as "RESERVED STATE", since SCI related to the TB retransmission indicates an MCS table, a UE may determine the coding rate of 2nd SCI based on coding rate related to an MCS index of the pre-configured order among MCS indexes indicating the modulation order indicated by an MCS index for "RESERVED STATE" in the indicated MCS table. Here, for example, an MCS index corresponding to the RESERVED STATE in the MCS table indicated above may be excluded.

For example, according to the fifth rule, when a UE successfully receives the previous SCI of SCI related to a TB retransmission, the UE can know the transport block size (TBS) of the corresponding retransmission resource. However, there may be ambiguity about an MCS value. In this case, for example, a UE may calculate the coding rate by dividing the number of REs in PSSCH currently scheduled by SCI in TBS, and dividing the modulation order (Qm) indicated by the MCS index corresponding to "RESERVED STATE" from the value obtained by dividing the number of REs of the PSSCH in the TBS. For example, a UE may determine the 2nd SCI based on the calculated coding rate. Here, for example, TBS may include at least one of the CRC of a TB or the CRC of a CB. Or, for example, the number of REs of the PSSCH may be the actual number of REs or the reference number of REs. For example, the reference number of REs may be the number of REs used to calculate TBS. Here, for example, when a UE calculates the coding rate according to the above-described rules, the UE may consider the number of PSSCH (e.g., TBS) layers.

For example, when an RX UE receives a MAC PDU in SLOT #N and an MCS field on SCI related to transmission of the MAC PDU is designated as "RESERVED STATE", the RX UE may use a reference MCS index to derive 2nd SCI coding rate. Or, for example, when an RX UE receives LCH data in SLOT #N and an MCS field on SCI related to transmission of LCH data is designated as "RESERVED STATE", the RX UE may use a reference MCS index to derive 2nd SCI coding rate. For example, the SCI may be SCI related to a retransmission of MAC PDU or a retransmission of LCH data.

For example, a reference MCS index may be configured to an MCS field value on the most recently successfully received SCI before SLOT #N. Here, for example, the SCI may be an SCI related to the same MAC PDU or an SCI related to the same LCH data. Or, for example, it may be an SCI related to initial transmission of the same MAC PDU or an SCI related to initial transmission of the same LCH data. Here, for example, an MCS field value may be a value other than RESERVED STATE. Here, for example, SCI from which a reference MCS index prior to SLOT #N is derived may be located within the maximum time gap (e.g., 32 slots) that can be signaled as one SCI. Or, for example, SCI from which a reference MCS index prior to SLOT #N is derived may be located within the maximum time gap that can be signaled as one pre-configured SCI. Here, for example, if an RX UE fails to receive SCI from which a reference MCS index is derived based on the above rule, the RX UE may determine an MCS index for deriving 2nd SCI coding rate based on at least one of the first to fifth rules described above. For example, an RX UE may determine an MCS index for deriving the 2nd SCI coding rate as a reference MCS index based on at least one of the first to fifth rules described above.

Meanwhile, in sidelink communication, when a TX UE receives HARQ feedback information (e.g., NACK) from an RX UE through a PSFCH, since it can be assumed that the RX UE successfully decodes a PSCCH (e.g., 1st SCI or 2nd SCI) transmitted from the TX UE, it may not be a problem even if an MCS field on SCI related to the TB retransmission is designated as "reserved state (hereinafter referred to as RESERVED STATE)".

At this time, when setting the time domain of a PT-RS on a resource related to the retransmission, if an MCS field related to the PT-RS is designated as "RESERVED STATE", a problem may arise in that the UE must determine the time density of the PT-RS. Hereinafter, according to an embodiment of the present disclosure, a method for setting the time density of a PT-RS when an MCS field on SCI related to a retransmission is designated as "RESERVED STATE" will be described.

TABLE 6

| 5.1.6.3 PT-RS reception procedure |
|---|

A UE shall report the preferred MCS and bandwidth thresholds based on the UE capability at a given carrier frequency, for each subcarrier spacing applicable to data channel at this carrier frequency, assuming the MCS table with the maximum Modulation Order as it reported to support.
If a UE is configured with the higher layer parameter phaseTrackingRS in DMRS-DownlinkConfig.
- the higher layer parameters timeDensity and frequencyDensity in PTRS-DownlinkConfig indicate the threshold values ptrs-MCS$_i$, i = 1, 2, 3 and N$_{RB,i}$, i = 0,1, as shown in Table 5.1.6.3-1 and Table 5.1.6.3-2, respectively,
- if either or both of the additional higher layer parameters timeDensity and frequencyDensity are configured, and the RNTI equals MCS-C-RNTI, C-RNTI or CS-RNTI, the UE shall assume the PT-RS. antenna port' presence and pattern is a function of the corresponding scheduled MCS of the corresponding codeword and scheduled bandwidth in corresponding bandwidth part as shown in Table 5.1.6.3-1 and Table 5.1.6.3-2.
  - if the higher layer parameter timeDensity given by PTRS-DownlinkConfig is not configured, the UE shall assume L$_{PT-RS}$ = 1.
  - if the higher layer parameter frequencyDensity given by PTRS-DownlinkConfig is not configured, the UE shall assume K$_{PT-RS}$ = 2.
- otherwise, if neither of the additional higher layer parameters timeDensity and frequencyDensity are configured and the RNTI equals MCS-C-RNTI, C-RNTI or CS-RNTI, the UE shall assume the PT-RS is present with L$_{PT-RS}$ = 1, K$_{PT-RS}$ = 2, and the UE shall assume PT-RS is not present when
  - the scheduled MCS from Table 5.1.3.1-1 is smaller than 10, or
  - the scheduled MCS from Table 5.1.3.1-2 is smaller than 5, or
  - the scheduled MCS from Table 5.1.3.1-3 is smaller than 15, or
  - the number of scheduled RBs is smaller than 3, or
- otherwise, if the RNTI equals RA-RNTI, [MsgB-RNTI), SI-RNTI, or P-RNTI, the UE shall assume PT-RS is not present

TABLE 7

| Scheduled MCS | Time density (L$_{PT-RS}$) |
|---|---|
| I$_{MCS}$ < ptrs-MCS$_1$ | PT-RS is not present |
| ptrs-MCS1 ≤ I$_{MCS}$ < ptrs-MCS2 | 4 |
| ptrs-MCS2 ≤ I$_{MCS}$ < ptrs-MCS3 | 2 |
| ptrs-MCS3 ≤ I$_{MCS}$ < ptrs-MCS4 | 1 |

TABLE 8

| Scheduled bandwidth | Frequency density ( K$_{PT-RS}$) |
|---|---|
| N$_{RB}$ < N$_{RB0}$ | PT-RS is not present |
| N$_{RB0}$ ≤ N$_{RB}$ < N$_{RB1}$ | 2 |
| N$_{RB1}$ ≤ N$_{RB}$ | 4 |

TABLE 9

| |
|---|
| If a UE is not configured with the higher layer parameter phaseTrackingRS in DMRS-DownlinkConfig, the UE assumes PT-RS is not present. |
| The higher layer parameter PTRS-DownlinkConfig provides the parameters ptrs-MCS$_i$, i = 1, 2, 3 and with values in range 0-29 when MCS Table 5.1.3.1-1 or MCS Table 5.1.3.1-3 is used and 0-28 when MCS Table 5.1.3.1-2 is |

TABLE 9-continued

| |
|---|
| used, respectively, ptrs-MCS4 is not explicitly configured by higher layers but assumed 29 when MCS Table 5.1.3.1-1 or MCS Table 5.1.3.1-3 is used and 28 when MCS Table 5.1.3.1-2 is used, respectively. The higher layer parameter frequencyDensity in PTRS-DownlinkConfig provides the parameters N$_{RBi}$ i = 0, 1 with values in range 1-276. If the higher layer parameter PTRS-DownlinkConfig indicates that the time density thresholds ptrs-MCS$_i$ = ptrs-MCS$_{i+1}$, then the time density L$_{PT-RS}$ of the associated row where both these thresholds appear in Table 5.1.6.3-1 is disabled. If the higher layer parameter PTRS-DownlinkConfig indicates that the frequency density thresholds N$_{RBi}$ = N$_{RBi+1}$, then the frequency density K$_{PTRS}$ of the associated row where both these thresholds appear in Table 5.1.6.3-2 is disabled. |

TABLE 9-continued

| |
|---|
| If either or both of the parameters PT-RS time density (L$_{PT-RS}$) and PT-RS frequency density (K$_{PT-RS}$), shown in Table 5.1.6.3-1 and Table 5.1.6.3-2, indicates that 'PT-RS not present', the UE shall asstime that PT-RS is not present. When the UE is receiving a PDSCH with allocation duration of 2 symbols as defined in Clause 7.4.1.1.2 of [4, TS 38.211] and if L$_{PT-RS}$ is set to 2 or 4, the UE shall assume PT-RS is not transmitted. When the UE is receiving a PDSCH with allocation duration of 4 symbols and if L$_{PT-RS}$ is set to 4, the UE shall assume PT-RS is not transmitted. When a UE is receiving PDSCH for retransmission, if the UE is scheduled with an MCS index greater than V, where V = 28 for MCS Table 5.1.3.1-1 and Table 5.1.3.1-3, and V = 27 for MCS Table 5.1.3.1-2 respectively, the MCS for the PT-RS time-density determination is obtained from the DCI received for the same transport block in the initial transmission, which is smaller than or equal to V. |

Referring to Tables 6 to 9, PT-RS configuration related to MCS can be performed based on Tables 6 to 9. For example, Table 7 shows the relationship between scheduled MCS and a time density of a PT-RS. For example, Table 8 shows the relationship between a frequency density of scheduled MCS and a PT-RS. For example, the configuration for a time density of a PT-RS may be determined according to an MCS value. For example, when an MCS field on SCI related to a retransmission is designated as "RESERVED STATE", a UE can configure a time density of a PT-RS based on an MCS field related to an initial transmission. However, for example, if a UE fails to decode an initial transmission and an MCS field on SCI related to a retransmission is designated as "RESERVED STATE", a problem may occur when setting a time density of the corresponding PT-RS. That is, in this case, for example, a UE may not have an MCS field for configuring a time density of a PT-RS. Or, for example, if an RX UE receives TB transmission resources three times (at this time, SCI related to each TB is referred to as SCI 1, SCI 2, and SCI 3), the RX UE may receive two SCIs and may not be able to receive any one SCI. For example, when an RX UE receives SCI 1 or SCI 2 after receiving SCI 3, if MCS values of SCI 1 and SCI 2 are different, the RX UE may have ambiguity regarding the previous MCS value. That is, for example, since the MSC values of SCI 1 and SCI 2 are different, it may be difficult for the RX UE to distinguish between SCI 1 and SCI 2, and ambiguity may occur regarding the time density of a PT-RS.

For example, when an MCS field on SCI related to a TB retransmission is indicated as "RESERVED STATE", according to the following various rules, a UE can determine a time density for a PT-RS on a (retransmission) PSSCH. For example, when an MCS field on SCI related to a TB retransmission is indicated as "RESERVED STATE", according to the following various rules, a UE may determine the presence or absence of a PT-RS or a time density for a PT-RS on a PSSCH related to a retransmission.

Here, for example, various embodiments of the present disclosure described below may be used by a TX UE to determine a time density of a PT-RS or whether a PT-RS exists when the TX UE performs a retransmission related to TB through an MCS field of RESERVED STATE. For example, a time density of a PT-RS or whether a PT-RS exists may be the same between a TX UE and an RX UE.

Alternatively, for example, a TX UE may determine a time density of a PT-RS or whether a PT-RS exists based on an MCS index, where an RX UE may determine a time density for a PT-RS or whether a PT-RS exists on a PSSCH indicated by an MCS field of RESERVED STATE according to various embodiments of the present disclosure. For example, a time density of a PT-RS or whether a PT-RS exists may be different between a TX UE and an RX UE.

Whether various embodiments of the present disclosure are applied or parameters related to various embodiments of the present disclosure may be specifically or differently configured based on at least one of cast type (e.g., unicast, groupcast, broadcast), QoS requirements (e.g., reliability, latency), type of service, priority of service, resource pool, congestion level of a resource pool (e.g., For example, CBR), HARQ feedback scheme (e.g., ACK/NACK feedback or feedback only sending NACK), MCS index, modulation order, CQI index/value, number of PSCCH/PSSCH symbols, DMRS of PSCCH/PSSCH, number of RBs of PSCCH/PSSCH, an initial transmission, a retransmission, or frequency range (e.g., FR 1 or FR2).

According to an embodiment of the present disclosure, when an MCS field on SCI related to a TB retransmission is indicated as "RESERVED STATE", a UE may determine a time density of a PT-RS based on a pre-configured MCS index. For example, when an MCS field on SCI related to a TB retransmission is indicated as "RESERVED STATE", a UE may determine a time density of a PT-RS based on a pre-configured value from a base station/network.

According to an embodiment of the present disclosure, a UE may determine a time density of a PT-RS based on target code rate/spectral efficiency for an MCS index of the same modulation order as the modulation order indicated by an MCS field designated as RESERVED STATE on an MCS table (hereinafter, MO_RV). For example, a UE may determine a time density of a PT-RS based on an MCS index corresponding to the highest target code rate/spectral efficiency among MCS indexes with the same modulation order as MO_RV on an MCS table. For example, a UE may determine a time density of a PT-RS based on an MCS index corresponding to the lowest target code rate/spectral efficiency among MCS indexes with the same modulation order as MO_RV on an MCS table. For example, a UE may determine a time density of a PT-RS based on the average value of target code rate/spectral efficiency for MCS indexes with the same modulation order as MO_RV on an MCS table. For example, a UE may determine a time density of a PT-RS based on an MCS index corresponding to a target code rate/spectral efficiency that is greater than the average value of target code rate/spectral efficiency for MCS indexes with the same modulation order as MO_RV on an MCS table and has the smallest difference from the average value. For example, a UE may determine a time density of a PT-RS based on an MCS index corresponding to a target code rate/spectral efficiency that is smaller than the average value of target code rate/spectral efficiency for MCS indexes with the same modulation order as MO_RV on an MCS table and has the smallest difference from the average value. For example, a UE may determine a time density of a PT-RS based on an MCS index of a pre-configured sequence among MCS indexes with the same modulation order as MO_RV on an MCS table.

According to an embodiment of the present disclosure, when a UE performs a retransmission related to TB through an MCS field designated as RESERVED STATE, the UE may consider/determine that the PT-RS does not exist. Or, for example, when a UE performs a retransmission related to TB through an MCS field designated as RESERVED STATE, the UE may consider/determine a time density of the PT-RS for a pre-configured MCS index. Or, for example, when a UE performs a retransmission related to TB through an MCS field designated as RESERVED STATE, the UE may consider/determine the smallest value among time densities of PT-RSs corresponding to a pre-configured MCS index range. Or, for example, when a UE performs a retransmission related to TB through an MCS field designated as RESERVED STATE, the UE may consider/determine the greatest value among time densities of PT-RSs corresponding to a pre-configured MCS index range.

For example, when an RX UE receives a MAC PDU in SLOT #N and an MCS field on SCI related to transmission of the MAC PDU is designated as "RESERVED STATE", the RX UE may use a reference MCS index to derive the time density of PT-RS. Or, for example, when an RX UE receives a LCH data in SLOT #N and an MCS field on SCI related to transmission of the LCH data is designated as "RESERVED STATE", the RX UE may use a reference MCS index to derive the time density of PT-RS. For example, the SCI may be an SCI related to retransmission of MAC PDU or retransmission of LCH data.

For example, a reference MCS index may be configured to an MCS field value on the most recently successfully received SCI before SLOT #N. Here, for example, the SCI may be SCI related to the same MAC PDU or SCI related to the same LCH data. Or, for example, it may be SCI related to an initial transmission of the same MAC PDU or SCI related to an initial transmission of the same LCH data. Here, for example, a value of an MCS field may be a value other than RESERVED STATE. Here, for example, SCI from which a reference MCS index prior to SLOT #N is derived may be located within a maximum time gap (e.g., 32 slots) that can be signaled as one SCI. Or, for example, SCI from which a reference MCS index prior to SLOT #N is derived may be located within a maximum time gap that can be signaled with one pre-configured SCI. Here, for example, if an RX UE fails to receive SCI from which a reference MCS index is derived based on the above rule, the RX UE may determine an MCS index for deriving a time density of a PT-RS based on at least one of the various embodiments of the present disclosure described above. For example, an RX UE may determine an MCS index for deriving a time density of a PT-RS as a reference MCS index based on at least one of the various embodiments of the present disclosure described above.

Meanwhile, in sidelink communication, when a TX UE receives HARQ feedback information (e.g., NACK) from an RX UE through a PSFCH, since it can be assumed that the RX UE successfully decodes a PSCCH (e.g., 1st SCI or 2nd SCI) transmitted from the TX UE, it may not be a problem even if an MCS field on SCI related to TB retransmission is designated as "reserved state (hereinafter referred to as RESERVED STATE)". Hereinafter, according to an embodiment of the present disclosure, conditions for designating an MCS field related to retransmission as "RESERVED STATE" will be described.

TABLE 10

| MCS Index $I_{MCS}$ | Modulation Order $Q_m$ | Target code Rate R x [1024] | Spectral efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4:5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Table 10 shows an example of an MCS index table. Table 8 shows an MCS field designated as "RESERVED STATE" for MCS indexes with MCS index values of 29 to 31.

For example, when the various conditions of the present disclosure are satisfied, a TX UE may not indicate "RESERVED STATE" in an MCS field on SCI for retransmission related to TB. For example, a TX UE may be configured not to indicate "RESERVED STATE" in an MCS field on SCI for retransmission related to a TB. For example, an MCS field on SCI related to a retransmission may be an actual MCS index. For example, an MCS field on SCI related to a transmission may be designated as an MCS index value used for actual retransmission. For example, an MCS field on SCI related to a retransmission may be designated as an MCS index value that determines TBS related to actual retransmission. Here, for example, an MCS index value may be a value excluding RESERVED STATE.

Here, for example, when an MCS field is indicated as "RESERVED STATE", it may be considered that TBS/MCS index related to the previous transmission remains the same even in retransmission. For example, the previous transmission may be an initial transmission. For example, when various conditions of the present disclosure below are not satisfied, it may be allowed that an MCS field on the SCI for retransmission related to TB is indicated as "RESERVED STATE". Specifically, for example, a TX UE transmits MAC PDU/LCH data with HARQ feedback enabled, and when receiving HARQ feedback information (e.g., NACK) through a PSFCH from an RX UE, it may be assumed that the RX UE successfully decodes a PSCCH (e.g., the first SCI/second SCI) transmitted from the TX UE. That is, a problem may not occur even if, for example, an MCS field on SCI related to TB retransmission is designated as "RESERVED STATE". Whether various embodiments of the present disclosure are applied or parameters related to various embodiments of the present disclosure may be specifically or differently configured based on at least one of cast type (e.g., unicast, groupcast, broadcast), QoS requirements (e.g., reliability, latency), type of service, priority of service, resource pool, Congestion level of the resource pool (e.g., CBR) or HARQ feedback method (e.g., ACK/NACK feedback or only NACK feedback).

According to an embodiment of the present disclosure, when a TX UE transmits MAC PDU/LCH data with HARQ feedback disabled, a TX UE may not indicate "RESERVED STATE" in an MCS field on SCI for retransmission related to TB. For example, if a TX UE performs blind retransmission, a TX UE may not indicate "RESERVED STATE" in an MCS field on SCI for retransmission related to TB. For example, blind retransmission may be an operation in which a TX UE performs retransmission without receiving HARQ feedback from an RX UE.

According to an embodiment of the present disclosure, when a TX UE transmits MAC PDU/LCH data with HARQ feedback enabled and does not receive HARQ feedback information through a PSFCH more than a pre-configured threshold number of times from an RX UE (e.g., DTX), a TX UE may not indicate "RESERVED STATE" in an MCS field on SCI for retransmission related to TB. For example, when a TX UE transmits MAC PDU/LCH data with HARQ feedback enabled and receives NACK information through a PSFCH more than a pre-configured threshold number of times from an RX UE, a TX UE may not indicate "RESERVED STATE" in an MCS field on SCI for retransmission related to TB. For example, this case may be a situation in which an RX UE fails to decode a PSCCH (e.g., first SCI or second SCI) transmitted from a TX UE. At this time, for example, if a TX UE indicates "RESERVED STATE" as an MCS field on SCI related to retransmission of the same TB, a problem in which an RX UE cannot derive the corresponding TB size may occur.

According to an embodiment of the present disclosure, when a TX UE cannot perform monitoring/receiving operation for a PSFCH transmitted by an RX UE due to prioritization of UL and SL, a TX UE may not indicate "RESERVED STATE" in an MCS field on SCI for retransmission related to TB. For example, if a priority related to UL transmission is higher than a priority related to PSFCH reception, a TX UE may not indicate "RESERVED STATE" in an MCS field on SCI for retransmission related to TB. For example, when a TX UE cannot perform monitoring/receiving operations for a PSFCH transmitted by an RX UE more than a pre-configured threshold number of times due to PSFCH transmission of a relatively high priority, a TX UE may not indicate "RESERVED STATE" in an MCS field on SCI for retransmission related to TB. In this case, for example, since a TX UE cannot know whether an RX UE successfully decodes a PSCCH (e.g., first SCI or second SCI), it may be desirable for the TX UE to operate conservatively.

According to an embodiment of the present disclosure, if a TX UE omits the previous PSCCH/PSSCH transmission due to prioritization of UL and SL or reselects resources related to PSCCH/PSSCH transmission, a TX UE may not indicate "RESERVED STATE" in an MCS field on SCI for retransmission related to TB. For example, if a TX UE skips the previous PSCCH/PSSCH transmission due to power sharing between UL and SL or reselects resources related to PSCCH/PSSCH transmission, a TX UE may not indicate "RESERVED STATE" in an MCS field on SCI for retransmission related to TB. For example, if a TX UE omits the previous PSCCH/PSSCH transmission due to congestion control/pre-emption or reselects resources related to PSCCH/PSSCH transmission, a TX UE may not indicate "RESERVED STATE" in an MCS field on SCI for retransmission related to TB. For example, if a TX UE omits previous PSCCH/PSSCH transmissions more than a pre-configured threshold number of times or reselects resources related to PSCCH/PSSCH transmissions that do not satisfy the HARQ RTT time line with existing reserved resources due to the above reasons, a TX UE may not indicate "RESERVED STATE" in an MCS field on SCI for retransmission related to TB. Here, for example, a PSCCH/PSSCH transmission may include PSCCH/PSSCH retransmission.

According to an embodiment of the present disclosure, when a TX UE performs PSCCH/PSSCH transmission by changing a resource pool, a TX UE may not indicate "RESERVED STATE" in an MCS field on SCI for retransmission related to TB. For example, when a TX UE performs new MAC PDU/LCH data transmission by changing a resource pool, a TX UE may not indicate "RESERVED STATE" in an MCS field on SCI for retransmission related to TB. Here, for example, a PSCCH/PSSCH transmission may include PSCCH/PSSCH retransmission.

According to an embodiment of the present disclosure, when groupcast-based MAC PDU/LCH data transmission is performed, a TX UE may not indicate "RESERVED STATE" in an MCS field on SCI for retransmission related to TB. Or, for example, when unicast-based MAC PDU/LCH data transmission is performed, a TX UE may not indicate "RESERVED STATE" in an MCS field on SCI for retransmission related to TB. For example, when HARQ feedback scheme that transmits only NACK based on the distance between a TX UE and an RX UE is applied, a TX UE may not indicate "RESERVED STATE" in an MCS field on SCI for retransmission related to TB. For example, when ACK/NACK HARQ feedback scheme is applied a TX UE may not indicate "RESERVED STATE" in an MCS field on SCI for retransmission related to TB.

According to an embodiment of the present disclosure, if resource reservation of PSCCH/PSSCH transmission from the previous SCI is not performed, a TX UE may not indicate "RESERVED STATE" in an MCS field on SCI for retransmission related to TB. For example, when the number of slots between the previous SCI and PSCCH/PSSCH transmission is greater than a pre-configured value (e.g., 32), a TX UE may not indicate "RESERVED STATE" in an MCS field on SCI for retransmission related to TB. Here, for example, the number of slots may be the number of logical slots. Here, for example, a PSCCH/PSSCH transmission may include a PSCCH/PSSCH retransmission.

For example, when an RX UE receives a MAC PDU in SLOT #N and an MCS field on SCI related to transmission of the MAC PDU is designated as "RESERVED STATE", the RX UE may use a reference MCS index to derive the time density of PT-RS. Or, for example, when an RX UE receives a LCH data in SLOT #N and an MCS field on SCI related to transmission of the LCH data is designated as "RESERVED STATE", the RX UE may use a reference MCS index to derive the time density of PT-RS. For example, the SCI may be an SCI related to retransmission of MAC PDU or retransmission of LCH data.

For example, a reference MCS index may be configured to an MCS field value on the most recently successfully received SCI before SLOT #N. Here, for example, the SCI may be SCI related to the same MAC PDU or SCI related to the same LCH data. Or, for example, it may be SCI related to an initial transmission of the same MAC PDU or SCI related to an initial transmission of the same LCH data. Here, for example, a value of an MCS field may be a value other than RESERVED STATE. Here, for example, SCI from which a reference MCS index prior to SLOT #N is derived may be located within a maximum time gap (e.g., 32 slots) that can be signaled as one SCI. Or, for example, SCI from which a reference MCS index prior to SLOT #N is derived may be located within a maximum time gap that can be signaled with one pre-configured SCI.

Figure 10:
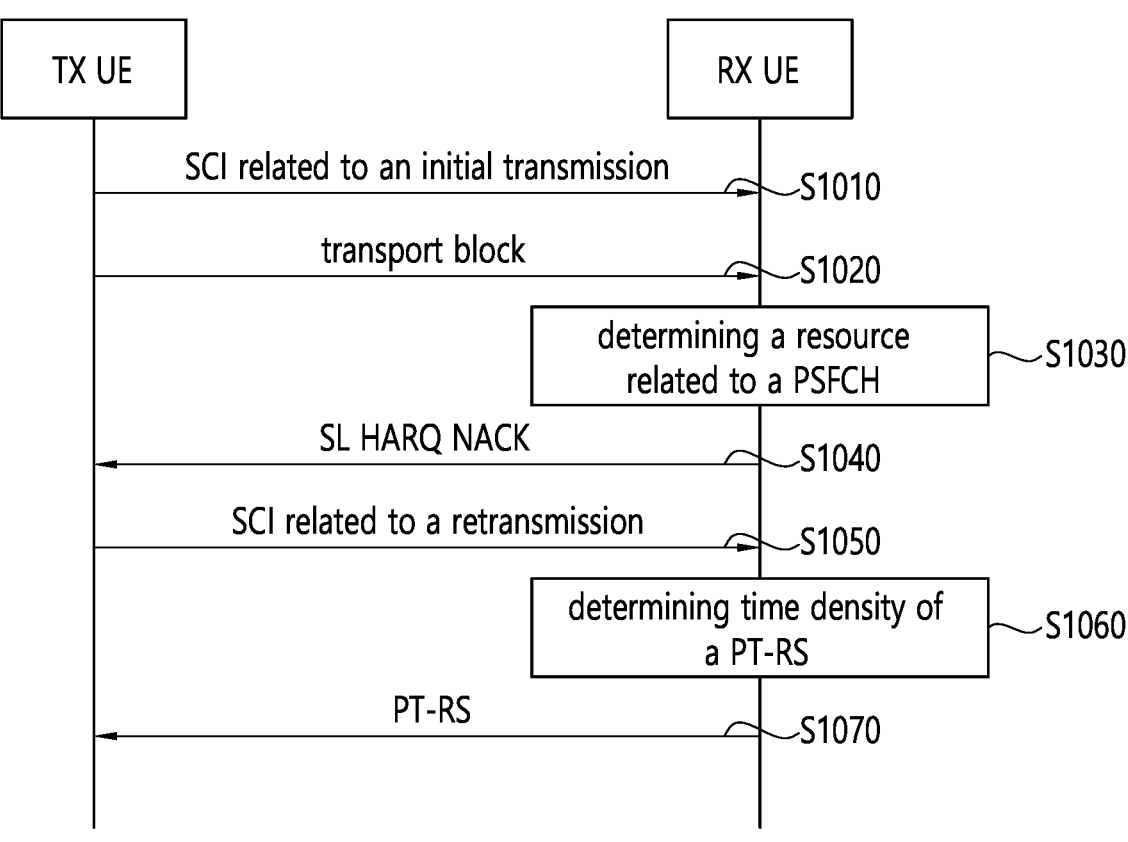
FIG. 10 shows a procedure in which a transmitting UE transmits a PT-RS to a receiving UE according to an embodiment of the present disclosure.
Figure 11:
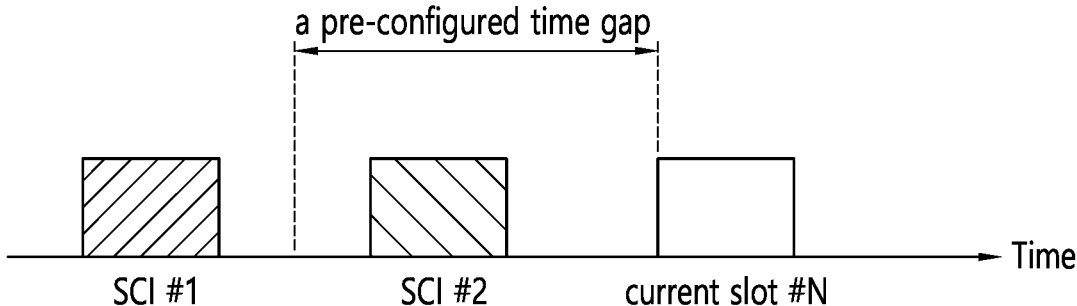
FIG. 11 shows SCI including an MCS table for deriving a time density of a PT-RS based on a current slot according to an embodiment of the present disclosure.

FIG. 10 shows a procedure in which a transmitting UE transmits a PT-RS to a receiving UE according to an embodiment of the present disclosure. FIG. 11 shows SCI including an MCS table for deriving a time density of a PT-RS based on a current slot according to an embodiment of the present disclosure. FIG. 10 and FIG. 11 may be combined with various embodiments of the present disclosure.

Referring to FIG. 10, in step S1010, a transmitting UE may transmit an SCI related to an initial transmission of a transport block to a receiving UE. For example, a transmitting UE may transmit SCI related to an initial transmission of a transport block to a receiving UE through a first PSCCH.

In step S1020, a transmitting UE may transmit a transport block to a receiving UE. For example, a transmitting UE may transmit a transport block to a receiving UE through a first PSSCH related to a first PSCCH.

In step S1030, a receiving UE may determine a resource related to a PSFCH. For example, a receiving UE may determine a resource related to a PSFCH based on an index of a subchannel and an index of a slot related to a first PSSCH.

In step S1040, a receiving UE may transmit an SL HARQ NACK related to a transport block to a transmitting UE. For example, a receiving UE may transmit an SL HARQ NACK related to a transport block to a transmitting UE based on a resource related to a PSFCH.

In step S1050, a transmitting UE may transmit SCI related to a retransmission of a transport block to a receiving UE. For example, a transmitting UE may transmit SCI related to a retransmission of a transport block to a receiving UE through a second PSCCH.

In step S1060, a receiving UE may determine a time density of a PT-RS based on SCI related to a retransmission of a transport block. For example, based on SCI related to a retransmission including an MCS index field indicating a reserved state, a receiving UE may determine a time density related to a PT-RS. For example, a time density related to a PT-RS may be determined based on a reference MCS index value related to an MCS index field indicating a reserved state.

For example, a reference MCS index value may be a pre-configured value from a base station or network.

TABLE 11

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

For example, a reference MCS index value may be any one of MCS index values with the same modulation order as an MCS index field indicating a reserved state. Table 11 shows an example of an MCS table. For example, referring to Table 11, when an MCS index indicating the reserved state is 28, the modulation order may be 2. That is, for example, any one of MCS index values 0 to 4 with a modulation order of 2 may be a reference MCS index value.

For example, a reference MCS index value may be an MCS index value with the highest target code rate or the highest spectral efficiency among MCS index values with the same modulation order. For example, referring to Table 11, when an MCS index indicating reserved state is 28, the modulation order may be 2. That is, for example, among MCS index values 0 to 4 with modulation order 2, the MCS index 4 which is with the highest target code rate or the highest spectral efficiency may be a reference MCS index value.

Or, for example, a reference MCS index value may be an MCS index value with the lowest target code rate or the lowest spectral efficiency among MCS index values with the same modulation order. For example, referring to Table 11, when an MCS index indicating reserved state is 28, the modulation order may be 2. That is, for example, among MCS index values 0 to 4 with modulation order 2, the MCS index 0 which is with the lowest target code rate or the lowest spectral efficiency may be a reference MCS index value.

For example, a reference MCS index value may be determined based on the average value of target code rate or the average value of spectral efficiency related to MCS index values with the same modulation order. For example, a reference MCS index value may be a value with the smallest difference value than the average value among MCS index values with the same modulation order. For example, a reference MCS index value may be a value greater than the average value of MCS index values with the same modulation order. Or, for example, a reference MCS index value may be a value smaller than the average value of MCS index values with the same modulation order. For example, referring to Table 11, when an MCS index indicating reserved state is 28, the modulation order may be 2. That is, for example, the average value of target code rates for MCS index values 0 to 4 with a modulation order of 2 may be 334.4. For example, the average value of spectral efficiency for MCS index values 0 to 4 with a modulation order of 2 may be 0.65316. For example, a reference index value may be 3, which is greater than the average value of target code rate and has the smallest difference from the average value of the target code rate. Alternatively, a reference index value may be 3, which is greater than the average value of spectral efficiency and has the smallest difference from the average value of the spectral efficiency. For example, a reference index value may be 2, which is smaller than the average value of target code rate and has the smallest difference from the average value of the target code rate. Alternatively, a reference index value may be 2, which is smaller than the average value of spectral efficiency and has the smallest difference from the average value of the spectral efficiency.

For example, a reference MCS index value may be an MCS index value in a pre-configured order among MCS index values with the same modulation order. For example, referring to Table 11, when an MCS index indicating reserved state is 28, the modulation order may be 2. For example, when pre-configured order is the third, 2, which is the third from MCS index values 0 to 4 with a modulation order of 2, may be a reference index value.

For example, an MCS index field indicating a state in which an SCI related to retransmission is reserved may include a reference MCS index value.

For example, an MCS field in the successfully received SCI in the closest slot prior to the slot in which SCI related to retransmission was received may include a reference MCS index. For example, the closest slot may be located within a maximum time gap that can be signaled with one SCI from a slot in which SCI related to retransmission is received. For example, the maximum time gap that can be signaled with one SCI may include 32 slots.

Referring to FIG. 11, a receiving UE may receive a transport block in current slot #N, and an MCS field on SCI related to the transport block may be designated as a reserved state. At this time, for example, if SCI successfully received by a receiving UE before the current slot #N is SCI #1 and SCI #2, the receiving UE may use an MCS field value in SCI #2 successfully received in the closest slot before the current slot #N as a reference MCS field. For example, SCI #2 may be an SCI related to initial transmission of a transport block. For example, SCI #2 may be located within a pre-configured time gap from the current slot #N. For example, a pre-configured time gap may include the maximum time gap that can be signaled with one SCI. For example, the maximum time gap may be 32 slots. For example, if there is no SCI located within a pre-configured time gap from the current slot #N, the receiving UE may use a value of an MCS index field indicating a state in which an SCI related to retransmission is reserved as a reference MCS index value.

In step S1070, the transmitting UE may transmit a PT-RS to the receiving UE based on a time density related to a PT-RS through a second PSSCH related to the second PSCCH.

Figure 12:
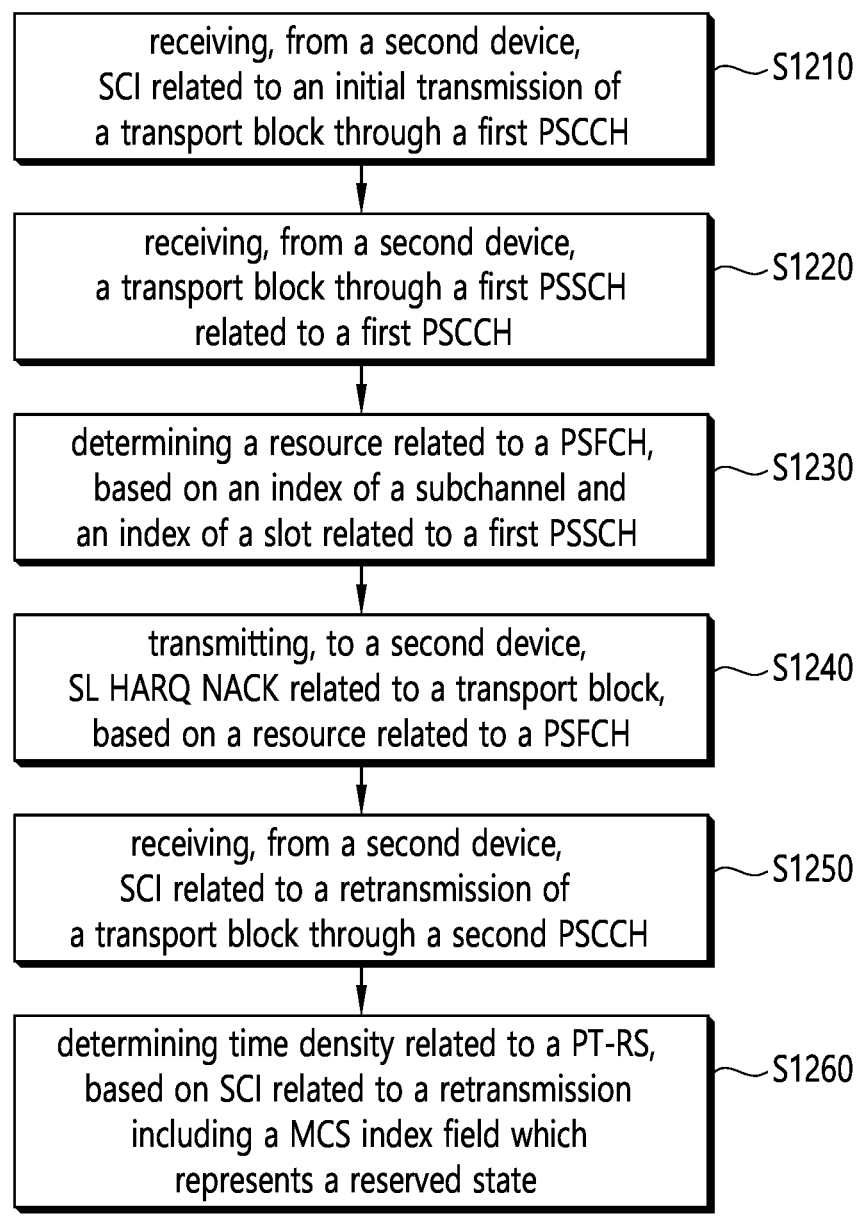
FIG. 12 shows a method for a first device to determine a time density related to a PT-RS based on SCI related to a retransmission according to an embodiment of the present disclosure.

FIG. 12 shows a method for a first device to determine a time density related to a PT-RS based on SCI related to a retransmission according to an embodiment of the present disclosure. The embodiment of FIG. 12 may be combined with various embodiments of the present disclosure.

Referring to FIG. 12, in step S1210, a first device 100 may receive, from a second device 200, sidelink control information (SCI) related to an initial transmission of a transport block through a first physical sidelink control channel (PSCCH).

In step S1220, the first device 100 may receive, from the second device 200, the transport block through a first physical sidelink shared channel (PSSCH) related to the first PSCCH.

In step S1230, the first device 100 may determine a resource related to a physical sidelink feedback channel (PSFCH), based on an index of a subchannel and an index of a slot related to the first PSSCH.

In step S1240, the first device 100 may transmit, to the second device 200, sidelink hybrid automatic repeat request negative acknowledgement (SL HARQ NACK) related to the transport block, based on the resource related to the PSFCH.

In step S1250, the first device 100 may receive, from the second device 200, SCI related to a retransmission of the transport block through a second PSCCH.

In step S1260, the first device 100 may determine a time density related to a phase-tracking reference signal (PT-RS), based on the SCI related to the retransmission including a modulation coding scheme (MCS) index field which represents a reserved state. For example, the time density related to the PT-RS is determined based on a reference MCS index value related to the MCS index field which represents the reserved state.

For example, the reference MCS index value may be a value pre-configured from a base station or a network.

For example, the reference MCS index value may be determined based on MCS index values with the same modulation order as the MCS index field which represents the reserved state.

For example, the reference MCS index value may be an MCS index value with a highest target code rate or a highest spectral efficiency among the MCS index values with the same modulation order.

For example, the reference MCS index value may be an MCS index value with a lowest target code rate or a lowest spectral efficiency among the MCS index values with the same modulation order.

For example, the reference MCS index value may be determined based on an average value of the MCS index values with the same modulation order. For example, the reference MCS index value may be an MCS index value with a smallest difference value from the average value among the MCS index values with the same modulation order. For example, the reference MCS index value may be a value greater than the average value. For example, the reference MCS index value may be a value smaller than the average value.

For example, the reference MCS index value may be an MCS index value in a pre-configured order among the MCS index values with the same modulation order.

For example, an MCS field in SCI successfully received in a closest slot before a slot in which the SCI related to the retransmission is received may include the reference MCS index value. For example, the closest slot may be located within a maximum time gap which can be signaled with one SCI from the slot in which the SCI related to the retransmission is received.

For example, the first device 100 may receive the PT-RS based on the time density related to the PT-RS through a second PSSCH related to the second PSCCH.

The above-described embodiment may be applied to various devices described below. For example, a processor 102 of a first device 100 may control a transceiver 106 to receive, from a second device 200, sidelink control information (SCI) related to an initial transmission of a transport block through a first physical sidelink control channel (PSCCH). And, the processor 102 of the first device 100 may control the transceiver 106 to receive, from the second device 200, the transport block through a first physical sidelink shared channel (PSSCH) related to the first PSCCH. And, the processor 102 of the first device 100 may determine a resource related to a physical sidelink feedback channel (PSFCH), based on an index of a subchannel and an index of a slot related to the first PSSCH. And, the processor 102 of the first device 100 may control the transceiver 106 to transmit, to the second device 200, sidelink hybrid automatic repeat request negative acknowledgement (SL HARQ NACK) related to the transport block, based on the resource related to the PSFCH. And, the processor 102 of the first device 100 may control the transceiver 106 to receive, from the second device 200, SCI related to a retransmission of the transport block through a second PSCCH. And, the processor 102 of the first device 100 may determine a time density related to a phase-tracking reference signal (PT-RS), based on the SCI related to the retransmission including a modulation coding scheme (MCS) index field which represents a reserved state.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive, from a second device, sidelink control information (SCI) related to an initial transmission of a transport block through a first physical sidelink control channel (PSCCH); receive, from the second device, the transport block through a first physical sidelink shared channel (PSSCH) related to the first PSCCH; determine a resource related to a physical sidelink feedback channel (PSFCH), based on an index of a subchannel and an index of a slot related to the first PSSCH; transmit, to the second device, sidelink hybrid automatic repeat request negative acknowledgement (SL HARQ NACK) related to the transport block, based on the resource related to the PSFCH; receive, from the second device, SCI related to a retransmission of the transport block through a second PSCCH; and determine a time density related to a phase-tracking reference signal (PT-RS), based on the SCI related to the retransmission including a modulation coding scheme (MCS) index field which represents a reserved state, wherein the time density related to the PT-RS may be determined based on a reference MCS index value related to the MCS index field which represents the reserved state.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive, from a second UE, sidelink control information (SCI) related to an initial transmission of a transport block through a first physical sidelink control channel (PSCCH); receive, from the second UE, the transport block through a first physical sidelink shared channel (PSSCH) related to the first PSCCH; determine a resource related to a physical sidelink feedback channel (PSFCH), based on an index of a subchannel and an index of a slot related to the first PSSCH; transmit, to the second UE, sidelink hybrid automatic repeat request negative acknowledgement (SL HARQ NACK) related to the transport block, based on the resource related to the PSFCH; receive, from the second UE, SCI related to a retransmission of the transport block through a second PSCCH; and determine a time density related to a phase-tracking reference signal (PT-RS), based on the SCI related to the retransmission including a modulation coding scheme (MCS) index field which represents a reserved state, wherein the time density related to the PT-RS may be determined based on a reference MCS index value related to the MCS index field which represents the reserved state.

According to an embodiment of the present disclosure, a non-transitory computer-readable storage medium storing instructions may be proposed. For example, the instructions, when executed, may cause a first device to: receive, from a second device, sidelink control information (SCI) related to an initial transmission of a transport block through a first physical sidelink control channel (PSCCH); receive, from the second device, the transport block through a first physical sidelink shared channel (PSSCH) related to the first PSCCH; determine a resource related to a physical sidelink feedback channel (PSFCH), based on an index of a subchannel and an index of a slot related to the first PSSCH; transmit, to the second device, sidelink hybrid automatic repeat request negative acknowledgement (SL HARQ NACK) related to the transport block, based on the resource related to the PSFCH; receive, from the second device, SCI related to a retransmission of the transport block through a second PSCCH; and determine a time density related to a phase-tracking reference signal (PT-RS), based on the SCI related to the retransmission including a modulation coding scheme (MCS) index field which represents a reserved state, wherein the time density related to the PT-RS may be determined based on a reference MCS index value related to the MCS index field which represents the reserved state.

Figure 13:
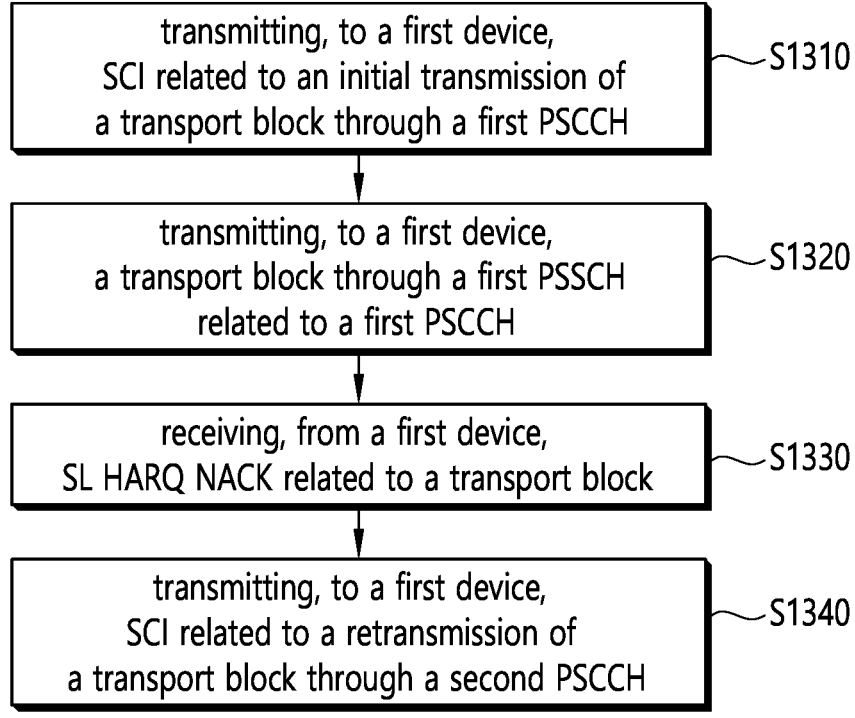
FIG. 13 shows a method for a second device to transmit an SCI related to retransmission to a first device according to an embodiment of the present disclosure.

FIG. 13 shows a method for a second device to transmit an SCI related to retransmission to a first device according to an embodiment of the present disclosure. The embodiment of FIG. 13 may be combined with various embodiments of the present disclosure.

Referring to FIG. 13, in step S1310, a second device 200 may transmit, to a first device 100, sidelink control information (SCI) related to an initial transmission of a transport block through a first physical sidelink control channel (PSCCH).

In step S1320, the second device 200 may transmit, to the first device 100, the transport block through a first physical sidelink shared channel (PSSCH) related to the first PSCCH.

In step S1330, the second device 200 may receive, from the first device 100, sidelink hybrid automatic repeat request negative acknowledgement (SL HARQ NACK) related to the transport block. For example, a resource related to a physical sidelink feedback channel (PSFCH) may be determined based on an index of a subchannel and an index of a slot related to the first PSSCH. For example, the second device may receive, from the first device 100, the SL HARQ NACK related to the transport block based on the resource related to the PSFCH.

In step S1340, the second device 200 may transmit, to the first device 100, SCI related to a retransmission of the transport block through a second PSCCH. For example, a time density related to a phase-tracking reference signal (PT-RS) may be determined based on the SCI related to the retransmission including a modulation coding scheme (MCS) index field which represents a reserved state. For example, the second device 200 may determine a time density related to a PT-RS based on the SCI related to the retransmission including a MCS index field which represents a reserved state. For example, the time density related to the PT-RS may be determined based on a reference MCS index value related to the MCS index field which represents the reserved state.

For example, the reference MCS index value may be a value pre-configured from a base station or a network.

For example, the reference MCS index value may be determined based on MCS index values with the same modulation order as the MCS index field which represents the reserved state.

For example, the reference MCS index value may be an MCS index value with a highest target code rate or a highest spectral efficiency among the MCS index values with the same modulation order.

For example, the reference MCS index value may be an MCS index value with a lowest target code rate or a lowest spectral efficiency among the MCS index values with the same modulation order.

For example, the reference MCS index value may be determined based on an average value of the MCS index values with the same modulation order. For example, the reference MCS index value may be an MCS index value with a smallest difference value from the average value among the MCS index values with the same modulation order. For example, the reference MCS index value may be a value greater than the average value. For example, the reference MCS index value may be a value smaller than the average value.

For example, the reference MCS index value may be an MCS index value in a pre-configured order among the MCS index values with the same modulation order.

For example, an MCS field in SCI successfully received in a closest slot before a slot in which the SCI related to the retransmission is received may include the reference MCS index value. For example, the closest slot may be located within a maximum time gap which can be signaled with one SCI from the slot in which the SCI related to the retransmission is received.

For example, the second device 200 may transmit, to the first device 100, the PT-RS based on the time density related to the PT-RS through a second PSSCH related to the second PSCCH.

The above-described embodiment may be applied to various devices described below. For example, a processor 202 of a second device 200 may control a transceiver 206 to transmit, to a first device 100, sidelink control information (SCI) related to an initial transmission of a transport block through a first physical sidelink control channel (PSCCH). And, the processor 202 of the second device 200 may control the transceiver 206 to transmit, to the first device 100, the transport block through a first physical sidelink shared channel (PSSCH) related to the first PSCCH. And, the processor 202 of the second device 200 may control the transceiver 206 to receive, from the first device 100, sidelink hybrid automatic repeat request negative acknowledgement (SL HARQ NACK) related to the transport block. And, the processor 202 of the second device 200 may control the transceiver 206 to transmit, to the first device 100, SCI related to a retransmission of the transport block through a second PSCCH.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: transmit, to a first device, sidelink control information (SCI) related to an initial transmission of a transport block through a first physical sidelink control channel (PSCCH); transmit, to the first device, the transport block through a first physical sidelink shared channel (PSSCH) related to the first PSCCH; receive, from the first device, sidelink hybrid automatic repeat request negative acknowledgement (SL HARQ NACK) related to the transport block; and transmit, to the first device, SCI related to a retransmission of the transport block through a second PSCCH, wherein a resource related to a physical sidelink feedback channel (PSFCH) may be determined based on an index of a subchannel and an index of a slot related to the first PSSCH, wherein the SL HARQ NACK may be received based on the resource related to the PSFCH, wherein a time density related to a phase-tracking reference signal (PT-RS) may be determined based on the SCI related to the retransmission including a modulation coding scheme (MCS) index field which represents a reserved state, and wherein the time density related to the PT-RS may be determined based on a reference MCS index value related to the MCS index field which represents the reserved state.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
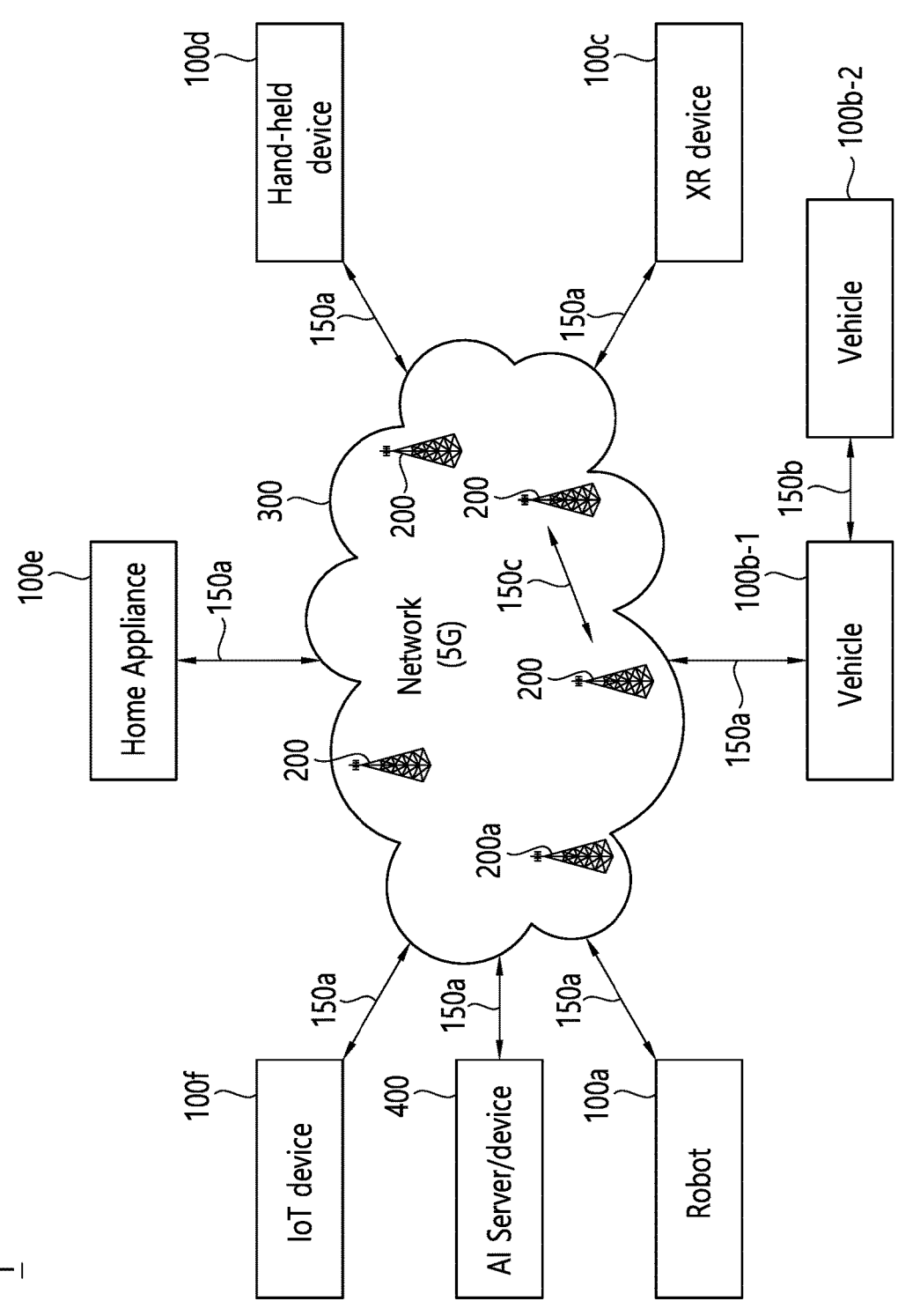
FIG. 14 shows a communication system 1, based on an embodiment of the present disclosure.

FIG. 14 shows a communication system 1, based on an embodiment of the present disclosure. The embodiment of FIG. 14 may be combined with various embodiments of the present disclosure.

Referring to FIG. 14, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Ve-hicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wire-less communication/connections 150a and 150b may trans-mit/receive signals through various physical channels. To this end, at least a part of various configuration information configuring processes, various signal processing processes (e.g., channel encoding/decoding, modulation/demodula-tion, and resource mapping/demapping), and resource allo-cating processes, for transmitting/receiving radio signals, may be performed based on the various proposals of the present disclosure.

Figure 15:
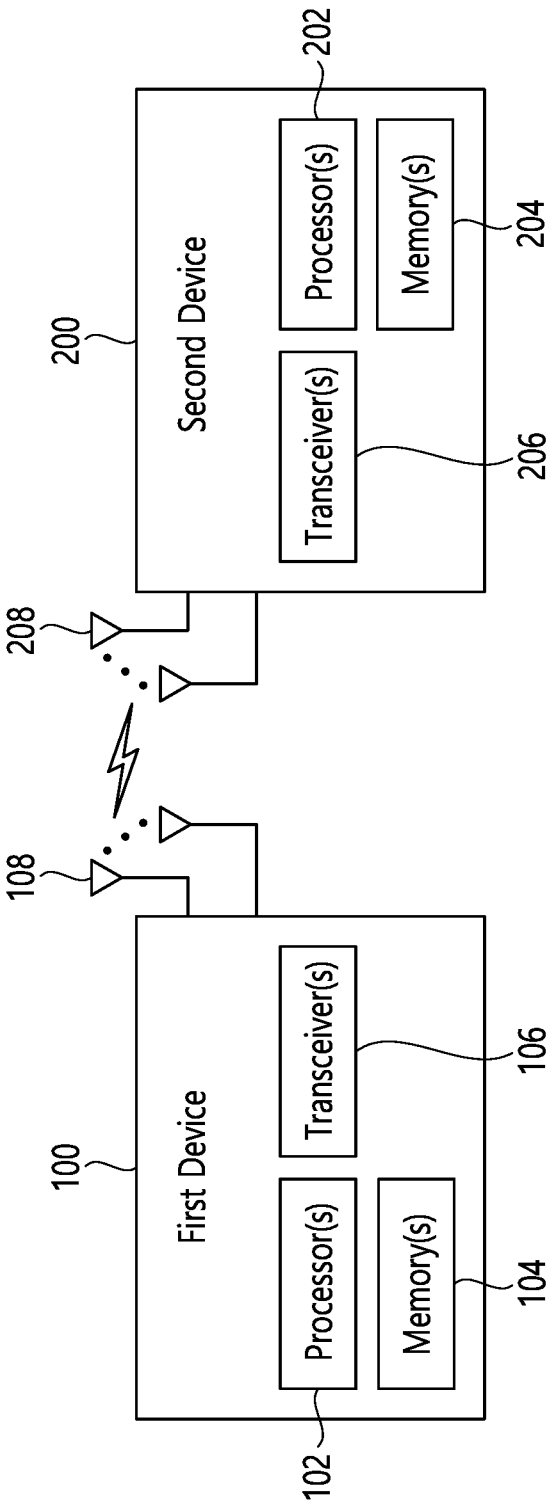
FIG. 15 shows wireless devices, based on an embodiment of the present disclosure.

FIG. 15 shows wireless devices, based on an embodiment of the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and addi-tionally further include one or more transceivers 106 and/or one or more antennas 108. The processor(s) 102 may control the memory(s) 104 and/or the transceiver(s) 106 and may be configured to implement the descriptions, functions, proce-dures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be inter-changeably used with Radio Frequency (RF) unit(s). In the present disclosure, the wireless device may represent a communication modem/circuit/chip.

The second wireless device 200 may include one or more processors 202 and one or more memories 204 and addi-tionally further include one or more transceivers 206 and/or one or more antennas 208. The processor(s) 202 may control the memory(s) 204 and/or the transceiver(s) 206 and may be configured to implement the descriptions, functions, proce-dures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be inter-changeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flow-charts disclosed in this document. The one or more proces-sors 102 and 202 may generate messages, control informa-tion, data, or information according to the descriptions, functions, procedures, proposals, methods, and/or opera-tional flowcharts disclosed in this document. The one or more processors 102 and 202 may generate signals (e.g., baseband signals) including PDUs, SDUs, messages, control information, data, or information according to the descrip-tions, functions, procedures, proposals, methods, and/or operational flowcharts disclosed in this document and pro-vide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
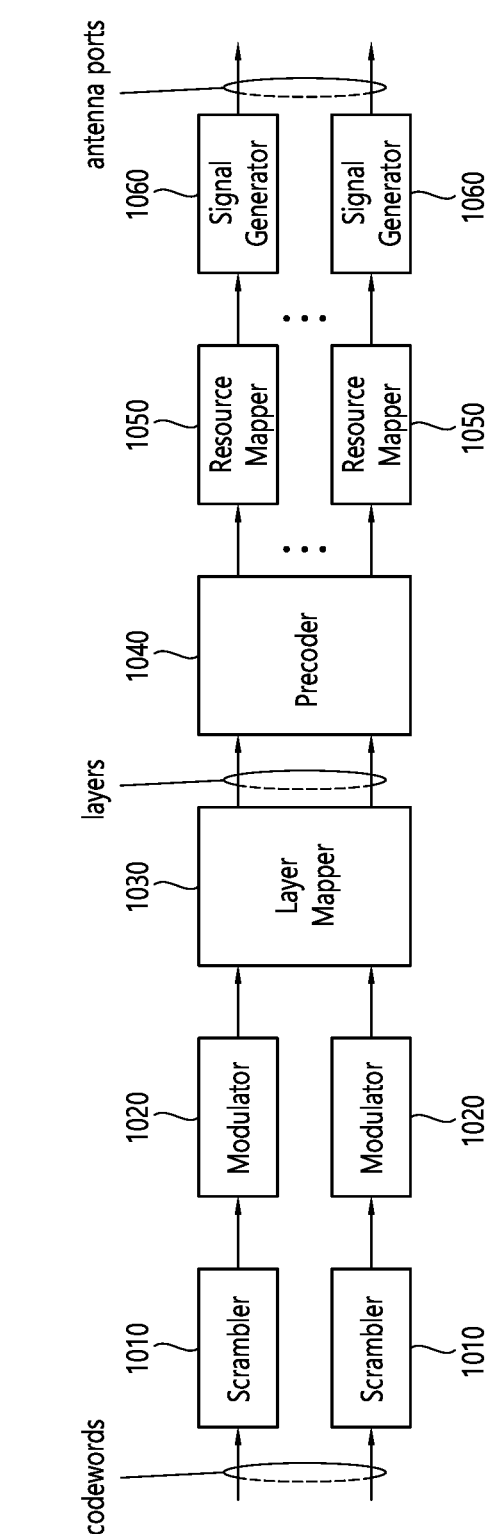
FIG. 16 shows a signal process circuit for a transmission signal, based on an embodiment of the present disclosure.

FIG. 16 shows a signal process circuit for a transmission signal, based on an embodiment of the present disclosure.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 17 shows another example of a wireless device, based on an embodiment of the present disclosure. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Figure 18:
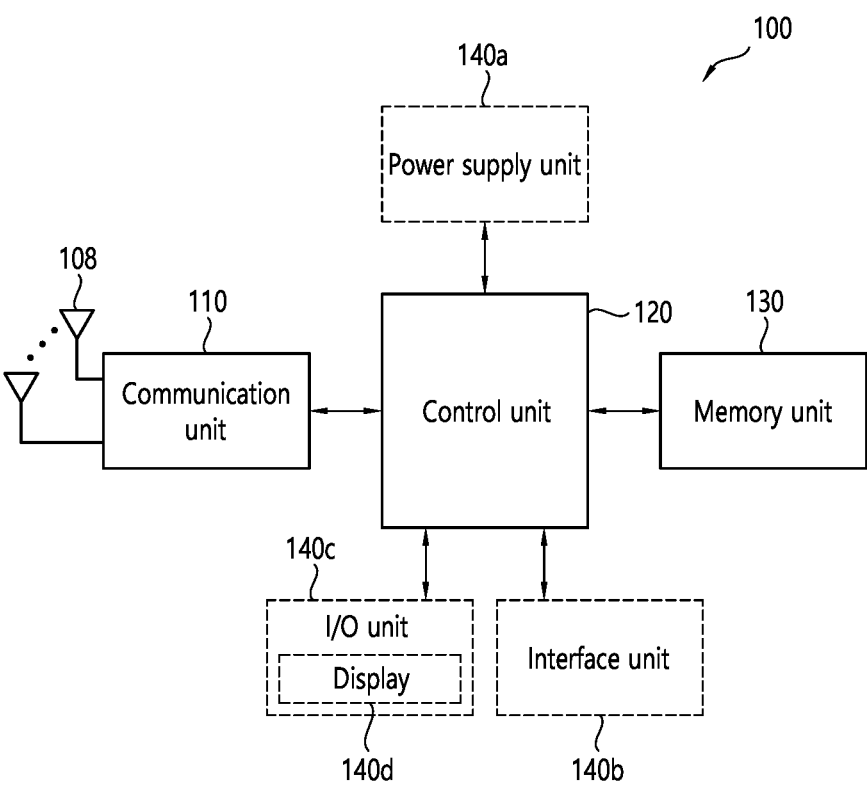
FIG. 18 shows a hand-held device, based on an embodiment of the present disclosure.

FIG. 18 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 19 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 19, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

receiving, from a second device, first sidelink control information (SCI) related to an initial transmission of a transport block through a first physical sidelink control channel (PSCCH);

receiving, from the second device, the transport block through a first physical sidelink shared channel (PSSCH) related to the first PSCCH:

determining a resource related to a physical sidelink feedback channel (PSFCH), based on an index of a subchannel and an index of a slot related to the first PSSCH:

transmitting, to the second device, sidelink hybrid automatic repeat request negative acknowledgement (SL HARQ NACK) related to the transport block, based on the resource related to the PSFCH:

receiving, from the second device, second SCI related to a retransmission of the transport block through a second PSCCH; and determining a time density related to a phase-tracking reference signal (PT-RS), based on the second SCI related to the retransmission including a modulation coding scheme (MCS) index field which represents a reserved state, wherein the time density related to the PT-RS is determined based on a reference MCS index value related to the MCS index field which represents the reserved state, and wherein the reference MCS index value is determined based on MCS index values with the same modulation order as the MCS index field which represents the reserved state.

2. The method of claim 1, further comprising:

receiving the PT-RS based on the time density related to the PT-RS through a second PSSCH related to the second PSCCH.

3. The method of claim 1, wherein the reference MCS index value is an MCS index value with a highest target code rate or a highest spectral efficiency among the MCS index values with the same modulation order.

4. The method of claim 1, wherein the reference MCS index value is an MCS index value with a lowest target code rate or a lowest spectral efficiency among the MCS index values with the same modulation order.

5. The method of claim 1, wherein the reference MCS index value is determined based on an average value of the MCS index values with the same modulation order.

6. The method of claim 5, wherein the reference MCS index value is an MCS index value with a smallest difference value from the average value among the MCS index values with the same modulation order.

7. The method of claim 6, wherein the reference MCS index value is a value greater than the average value.

8. The method of claim 6, wherein the reference MCS index value is a value smaller than the average value.

9. The method of claim 1, wherein the reference MCS index value is an MCS index value in a pre-configured order among the MCS index values with the same modulation order.

10. The method of claim 1, wherein an MCS field in third SCI successfully received in a closest slot before a slot in which the second SCI related to the retransmission is received includes the reference MCS index value.

11. The method of claim 10, wherein the closest slot is located within a maximum time gap which can be signaled with one SCI from the slot in which the second SCI related to the retransmission is received.

12. A first device comprising:

one or more processors;

one or more transceivers; and one or more memories connected to the one or more processors and storing instructions, wherein the instructions, based on being executed by the one or more processors, cause the first device to:

receive, from a second device, first sidelink control information (SCI) related to an initial transmission of a transport block through a first physical sidelink control channel (PSCCH):

receive, from the second device, the transport block through a first physical sidelink shared channel (PSSCH) related to the first PSCCH:

determine a resource related to a physical sidelink feedback channel (PSFCH), based on an index of a subchannel and an index of a slot related to the first PSSCH:

transmit, to the second device, sidelink hybrid automatic repeat request negative acknowledgement (SL HARQ NACK) related to the transport block, based on the resource related to the PSFCH:

receive, from the second device, second SCI related to a retransmission of the transport block through a second PSCCH; and determine a time density related to a phase-tracking reference signal (PT-RS), based on the second SCI related to the retransmission including a modulation coding scheme (MCS) index field which represents a reserved state, wherein the time density related to the PT-RS is determined based on a reference MCS index value related to the MCS index field which represents the reserved state, and wherein the reference MCS index value is determined based on MCS index values with the same modulation order as the MCS index field which represents the reserved state.

13. A processing device adapted to control a first device, the processing device comprising:

one or more processors; and one or more memories connected to the one or more processors and storing instructions, wherein the instructions, based on being executed by the one or more processors, cause the first device to:

receive, from a second device, first sidelink control information (SCI) related to an initial transmission of a transport block through a first physical sidelink control channel (PSCCH);

receive, from the second device, the transport block through a first physical sidelink shared channel (PSSCH) related to the first PSCCH;

determine a resource related to a physical sidelink feedback channel (PSFCH), based on an index of a subchannel and an index of a slot related to the first PSSCH;

transmit, to the second device, sidelink hybrid automatic repeat request negative acknowledgement (SL HARQ NACK) related to the transport block, based on the resource related to the PSFCH;

receive, from the second device, second SCI related to a retransmission of the transport block through a second PSCCH; and determine a time density related to a phase-tracking reference signal (PT-RS), based on the second SCI related to the retransmission including a modulation coding scheme (MCS) index field which represents a reserved state, wherein the time density related to the PT-RS is determined based on a reference MCS index value related to the MCS index field which represents the reserved state, and wherein the reference MCS index value is determined based on MCS index values with the same modulation order as the MCS index field which represents the reserved state.

* * * * *